(12) United States Patent
Jang et al.

(10) Patent No.: US 11,537,360 B2
(45) Date of Patent: Dec. 27, 2022

(54) SYSTEM FOR PROCESSING USER UTTERANCE AND CONTROL METHOD OF SAME

(71) Applicant: Samsung Electronics Co., Ltd., Suwon-si (KR)

(72) Inventors: Dongho Jang, Anyang-si (KR); Wooup Kwon, Osan-si (KR); Dongyeop Kim, Anyang-si (KR); Jihyun Kim, Osan-si (KR); Gajin Song, Anyang-si (KR); Yongjoon Jeon, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 156 days.

(21) Appl. No.: 17/047,377

(22) PCT Filed: Apr. 9, 2019

(86) PCT No.: PCT/KR2019/004220
§ 371 (c)(1),
(2) Date: Oct. 13, 2020

(87) PCT Pub. No.: WO2019/199030
PCT Pub. Date: Oct. 17, 2019

(65) Prior Publication Data
US 2021/0149627 A1 May 20, 2021

(30) Foreign Application Priority Data
Apr. 11, 2018 (KR) .......................... 10-2018-0042184

(51) Int. Cl.
*G10L 15/22* (2006.01)
*G06F 3/16* (2006.01)
(Continued)

(52) U.S. Cl.
CPC .............. *G06F 3/167* (2013.01); *G10L 15/22* (2013.01); *H04L 51/18* (2013.01); *H04L 51/234* (2022.05); *G10L 2015/223* (2013.01)

(58) Field of Classification Search
CPC .................................. G06F 3/167; G10L 15/22
See application file for complete search history.

(56) References Cited

U.S. PATENT DOCUMENTS

| 9,471,101 B2 | 10/2016 | Kim et al. |
| 9,696,963 B2 | 7/2017 | Son et al. |

(Continued)

FOREIGN PATENT DOCUMENTS

| KR | 10-1031405 B1 | 4/2011 |
| KR | 10-2012-0107306 A | 10/2012 |

(Continued)

OTHER PUBLICATIONS

International Search Report dated Aug. 2, 2019 in connection with International Patent Application No. PCT/KR2019/004220, 2 pages.

*Primary Examiner* — Ibrahim Siddo

(57) ABSTRACT

Disclosed is a system. A system according to an embodiment includes: a first electronic device which includes a wireless communication circuit, a microphone, and a speaker, at least one processor which is a part of the first electronic device or remotely communicates with the electronic device; and at least one memory which resides on the first electronic device or on the outside of the first electronic device while operatively connected with the at least one processor, wherein the memory can store instructions which, when executed, cause the processor to: receive through the microphone a voice input including a request for performing a task that uses the first electronic device and is related to the transmission of data to a second external device; extract at least one parameter from the voice input; perform the task by using the wireless communication circuit; and transmit at least a (Continued)

portion of the at least one parameter to the second external device. Other embodiments understood through the present specification are also passible.

15 Claims, 16 Drawing Sheets

(51) Int. Cl.
*H04L 51/18* (2022.01)
*H04L 51/234* (2022.01)

(56) References Cited

U.S. PATENT DOCUMENTS

2016/0154624 A1\* 6/2016 Son ..................... G06F 3/0416
                                                                  704/235
2017/0132019 A1   5/2017 Karashchuk et al.

FOREIGN PATENT DOCUMENTS

| KR | 10-2014-0076693 A | 6/2014 |
| KR | 10-2014-0107736 A | 9/2014 |
| KR | 10-2015-0029976 A | 3/2015 |
| KR | 10-2016-0065503 A | 6/2016 |
| KR | 10-2017-0064417 A | 6/2017 |

\* cited by examiner

SYSTEM FOR PROCESSING USER UTTERANCE AND CONTROL METHOD OF SAME

CROSS-REFERENCE TO RELATED APPLICATIONS

This application is a 371 of International Application No. PCT/KR2019/004220 filed on Apr. 9, 2019, which claims priority to Korean Patent Application No. 10-2018-0042184 filed on Apr. 11, 2018, the disclosures of which are herein incorporated by reference in their entirety.

BACKGROUND

1. Field

Embodiments disclosed in this specification refer to a technology for processing a user utterance.

2. Description of Related Art

Recent electronic devices may support a voice input method. For example, in a state where a speech recognition service is executed, the electronic devices such as a smartphone or a tablet PC may recognize a user's utterance and may execute an operation corresponding to the utterance.

The speech recognition service may receive the user's utterance as an input, and may recognize the received utterance. The speech recognition service may provide the user with the result corresponding to the utterance, using a specific phrase included in the user's utterance. For example, the speech recognition service may grasp the user's intent from the utterance based on a natural language processing technology and may provide the user with the result matched with the grasped intent.

An electronic device may provide a message services (e.g., a messenger or an email). A plurality of electronic devices may transmit and receive messages with each other through the message service. When a message is received, the electronic device may output a notification through a display or speaker to inform the user that a message has been received.

An electronic device providing a speech recognition service may receive an utterance from a user and may transmit a message in response to the utterance. The utterance may include context information associated with a message. For example, the electronic device receiving the message may output a notification (e.g., a notification message) of the received message, using information such as whether the message has been received, and the recipient (an incoming phone number) of the message. Because the notification of the message includes only limited information, the electronic device may fail to provide the user with various pieces of information (e.g., the content of the message) about the message. Accordingly, the user may not know what content the received message contains, only through the notification.

Various embodiments of the disclosure may provide an electronic device capable of providing a notification including various pieces of information about a received message.

SUMMARY

According to an embodiment disclosed in this specification, a system may include a first electronic device including a wireless communication circuit, a microphone, and a speaker, at least one processor, which is a part of the first electronic device or which remotely communicates with the first electronic device, and at least one memory that resides on the first electronic device or outside the first electronic device, while being operatively connected to the at least one processor. The memory may store instructions that, when executed, cause the at least one processor to receive a voice input through the microphone, to extract at least one parameter from the voice input; to perform the task using the wireless communication circuit, and to transmit at least part of the at least one parameter to the second external device. The voice input may include a request to perform a task using the first electronic device, and the task is associated with transmitting data to a second external device.

Furthermore, according to an embodiment disclosed in this specification, a system may include a first electronic device including a communication circuit, a microphone, and a speaker, at least one processor, which is a part of the first electronic device or which remotely communicates with the first electronic device, and at least one memory that resides on the first electronic device or outside the first electronic device, while being operatively connected to the at least one processor. The memory may store instructions that, when executed, cause the at least one processor to receive a user utterance through the microphone, to extract at least one parameter from the user utterance, to perform a task using the communication circuit or a server, and to transmit at least part of at least one parameter to the second external device. The user utterance may include a request to perform a task associated with transmitting data to a second external device.

Moreover, according to an embodiment disclosed in this specification, at least one server may include at least one processor providing a message service, a wireless communication circuit communicating with a first electronic device registered in the message service and a second electronic device registered in the message service, and at least one memory electrically connected to the at least one processor and storing instructions. The instructions may, when executed, cause the at least one processor to receive a voice input from the first electronic device through the message service, to extract context information associated with the content file from the voice input, and to transmit the extracted context information and a message including the content file to the second electronic device through the message service. The voice input may correspond to a message sending request including a content file.

Also, according to an embodiment disclosed in this specification, an electronic device may include a display, a speaker, a wireless communication circuit, a memory storing instructions, and at least one processor. The at least one processor may be configured to execute the stored instructions to control the wireless communication circuit to receive a message including a content file and context information associated with the content file from an external electronic device, together, as a specified condition is satisfied, to generate a notification message for receiving the content file by using the context information and to output the generated notification message through the speaker as a voice, and as the specified condition is not satisfied, to set the message to be displayed on the display. The notification message may include at least one keyword included in the context information.

According to embodiments disclosed in this specification, an electronic device may provide information about the content file included in the received message as a notification of receiving a message, using a user's utterance.

Besides, a variety of effects directly or indirectly understood through the specification may be provided.

With regard to description of drawings, the same or similar denotations may be used for the same or similar components.

DETAILED DESCRIPTION

Hereinafter, various embodiments of the disclosure may be described with reference to accompanying drawings. However, it should be understood that this is not intended to limit the disclosure to specific implementation forms and includes various modifications, equivalents, and/or alternatives of embodiments of the disclosure.

Figure 1:
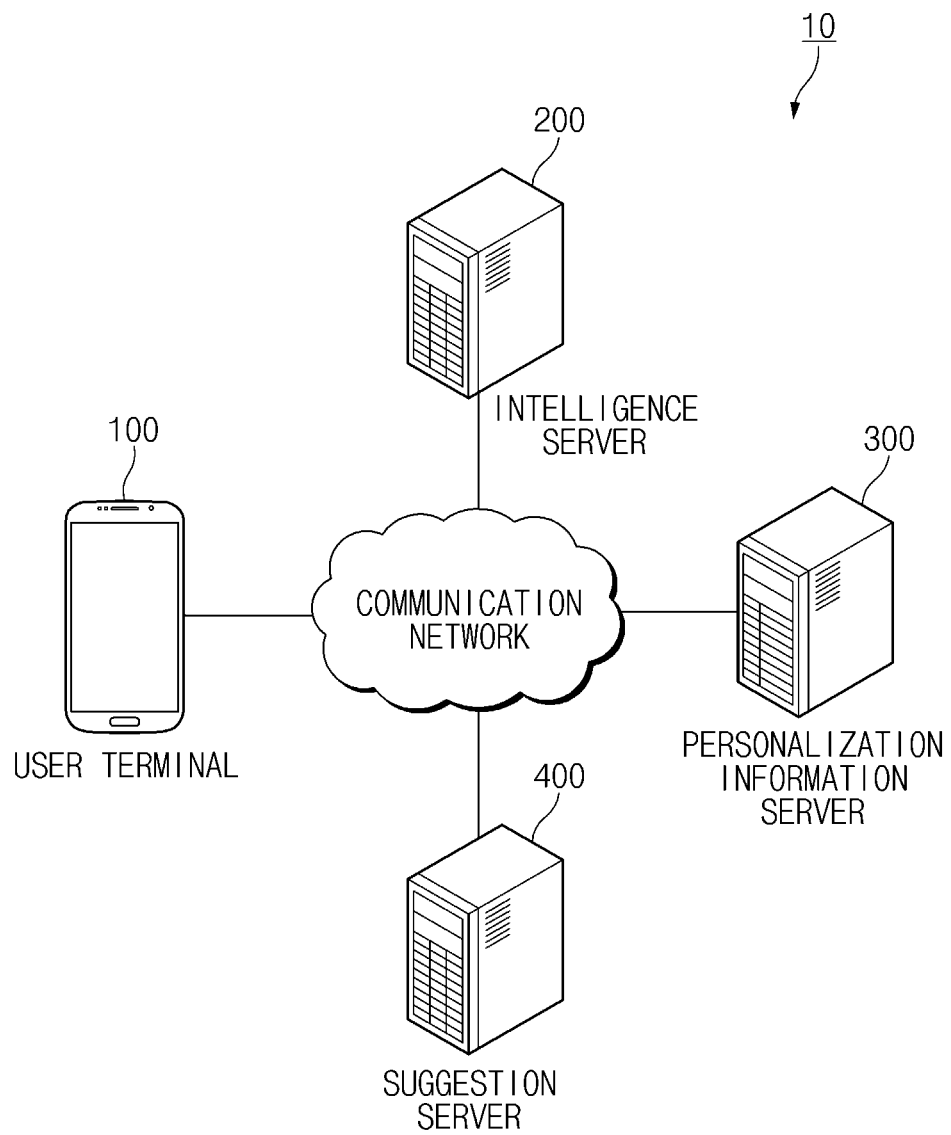
FIG. 1 is a view illustrating an integrated intelligence system, according to various embodiments of the disclosure.

FIG. 1 is a view illustrating an integrated intelligence system, according to various embodiments of the disclosure.

Referring to FIG. 1, an integrated intelligence system 10 may include a user terminal 100, an intelligence server 200, a personalization information server 300, or a suggestion server 400.

The user terminal 100 may provide a service necessary for a user through an app (or an application program) (e.g., an alarm app, a message app, a picture (gallery) app, or the like) stored in the user terminal 100. For example, the user terminal 100 may execute and operate another app through an intelligence app (or a speech recognition app) stored in the user terminal 100. The user terminal 100 may receive a user input for executing the other app and executing an action through the intelligence app of the user terminal 100. For example, the user input may be received through a physical button, a touch pad, a voice input, a remote input, or the like. According to an embodiment, various types of terminal devices (or an electronic device), which are connected with Internet, such as a mobile phone, a smartphone, personal digital assistant (PDA), a notebook computer, and the like may correspond to the user terminal 100.

According to an embodiment, the user terminal 100 may receive a user utterance as a user input. The user terminal 100 may receive the user utterance and may generate a command for operating an app based on the user utterance. Accordingly, the user terminal 100 may operate the app, using the command.

The intelligence server 200 may receive a user voice input from the user terminal 100 over a communication network and may change the user voice input to text data. In another embodiment, the intelligence server 200 may generate (or select) a path rule based on the text data. The path rule may include information about an action (or an operation) for performing the function of an app or information about a parameter necessary to perform the action. In addition, the path rule may include the order of the action of the app. The user terminal 100 may receive the path rule, may select an app depending on the path rule, and may execute the action included in the path rule in the selected app.

Generally, the term "path rule" of the disclosure may mean, but not limited to, the sequence of states, which allows the electronic device to perform the task requested by the user. In other words, the path rule may include information about the sequence of the states. For example, the task may be a certain action that the intelligence app is capable of providing. The task may include the generation of a schedule, the transmission of a picture to the desired counterpart, or the provision of weather information. The user terminal 100 may perform the task by sequentially having at least one or more states (e.g., the operating state of the user terminal 100).

According to an embodiment, the path rule may be provided or generated by an artificial intelligent (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment, the path rule may be selected from a set of predefined path rules or may be generated in real time in response to a user request. For example, the AI system may select at least a path rule among the predefined plurality of path rules or may generate a path rule dynamically (or in real time). Furthermore, the user terminal 100 may use a hybrid system to provide the path rule.

According to an embodiment, the user terminal 100 may execute the action and may display a screen corresponding to a state of the user terminal 100, which executes the action, on a display. For another example, the user terminal 100 may execute the action and may not display the result obtained by executing the action in the display. For example, the user terminal 100 may execute a plurality of actions and may display only the result of a part of the plurality of actions on the display. For example, the user terminal 100 may display only the result, which is obtained by executing the last action, on the display. For another example, the user terminal 100 may receive the user input to display the result obtained by executing the action in the display.

The personalization information server 300 may include a database in which user information is stored. For example, the personalization information server 300 may receive the user information (e.g., context information, execution of an app, or the like) from the user terminal 100 and may store the user information in the database. The intelligence server 200 may be used to receive the user information from the personalization information server 300 over the communication network and to generate a path rule associated with the user input. According to an embodiment, the user terminal 100 may receive the user information from the personalization information server 300 over the communication network, and may use the user information as information for managing the database.

The suggestion server 400 may include a database storing information about a function in a terminal, introduction of an application, or a function to be provided. For example, the suggestion server 400 may include a database associated with a function that a user utilizes by receiving the user information of the user terminal 100 from the personalization information server 300. The user terminal 100 may receive information about the function to be provided from the suggestion server 400 over the communication network and may provide the information to the user.

Figure 2:
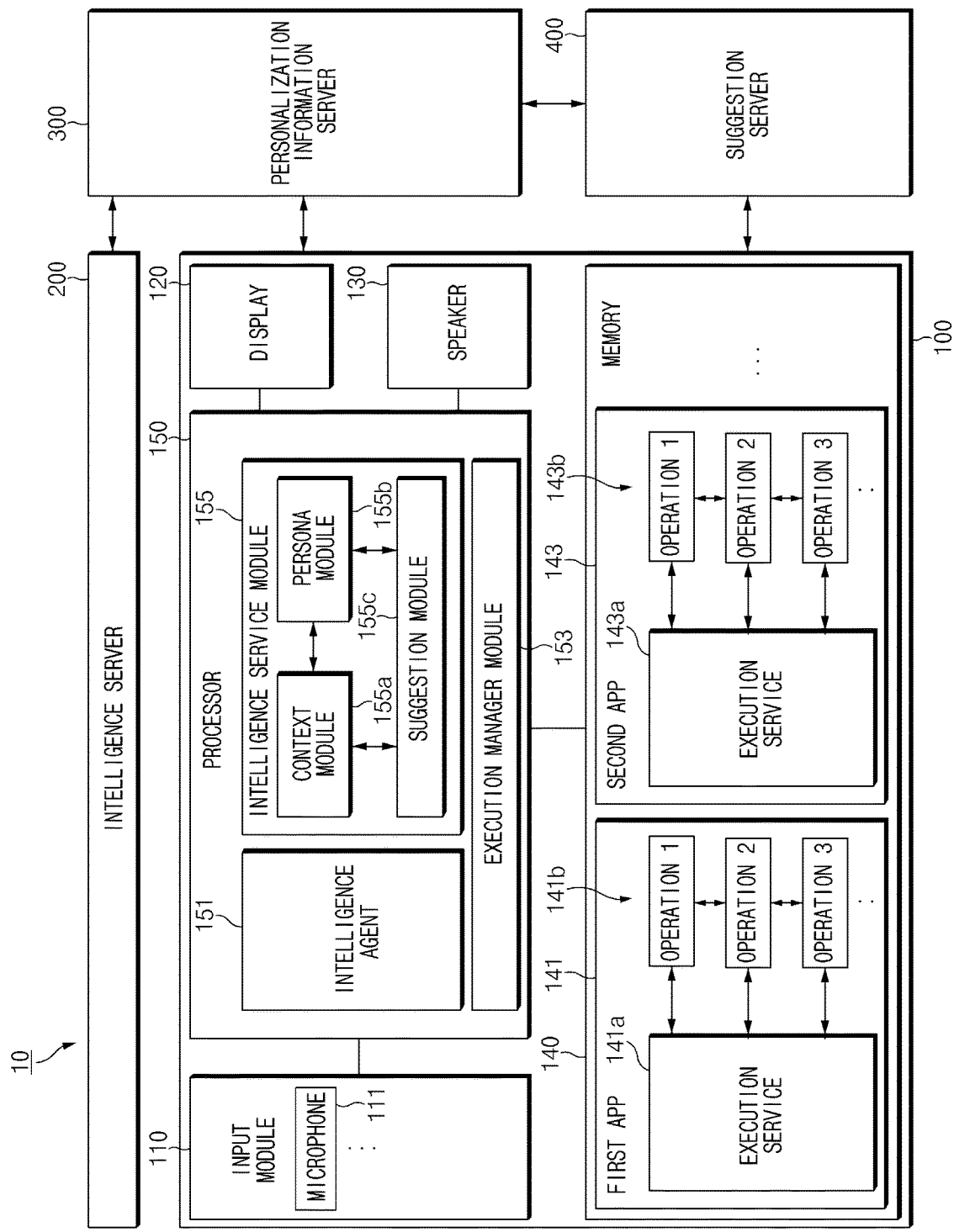
FIG. 2 is a block diagram illustrating a user terminal of an integrated intelligence system, according to an embodiment of the disclosure.

FIG. 2 is a block diagram illustrating a user terminal of an integrated intelligence system, according to an embodiment of the disclosure.

Referring to FIG. 2, the user terminal 100 may include an input module 110, a display 120, a speaker 130, a memory 140, or a processor 150. The user terminal 100 may further include housing, and elements of the user terminal 100 may be seated in the housing or may be positioned on the housing. The user terminal 100 may further include a communication circuit positioned in the housing. The user terminal 100 may transmit or receive data (or information) to or from an external server (e.g., the intelligence server 200) through the communication circuit.

According to an embodiment, the input module 110 may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) positioned in the user terminal 100 (or the housing of the user terminal 100).

According to an embodiment, the input module 110 may include a microphone capable of receiving the utterance of the user as a voice signal. For example, the input module 110 may include a speech input system and may receive the utterance of the user as a voice signal through the speech input system. For example, the microphone may be exposed through a part (e.g., a first portion) of the housing.

According to an embodiment, the display 120 may display an image, a video, and/or an execution screen of an application. For example, the display 120 may display a graphic user interface (GUI) of an app. According to an embodiment, the display 120 may be exposed to a part (e.g., a second part) of the housing.

According to an embodiment, the speaker 130 may output a voice signal. For example, the speaker 130 may output the voice signal generated in the user terminal 100 to the outside. According to an embodiment, the speaker 130 may be exposed to a part (e.g., a third portion) of the housing.

According to an embodiment, the memory 140 may store a plurality of apps (or application programs) 141 and 143. For example, the plurality of apps 141 and 143 may be a program for performing a function corresponding to the user input. According to an embodiment, the memory 140 may store an intelligence agent 145, an execution manager module 147, or an intelligence service module 149. For example, the intelligence agent 145, the execution manager module 147, and the intelligence service module 149 may be a framework (or application framework) for processing the received user input (e.g., user utterance).

According to an embodiment, the memory 140 may include a database capable of storing information necessary to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may operate after being loaded by the execution manager module 147. The plurality of apps 141 and 143 may include execution service modules 141*a* and 143*a* performing a function. In an embodiment, the plurality of apps 141 and 143 may perform a plurality of actions (e.g., a sequence of states) 141*b* and 143*b* through execution service modules 141*a* and 143*a* to perform a function. In other words, the execution service modules 141*a* and 143*a* may be activated by the execution manager module 147, and then may execute the plurality of actions 141*b* and 143*b*.

According to an embodiment, when the actions 141*b* and 143*b* of the apps 141 and 143 are executed, an execution state screen according to the execution of the actions 141*b* and 143*b* may be displayed in the display 120. For example, the execution state screen may be a screen in a state where the actions 141*b* and 143*b* are completed. For another example, the execution state screen may be a screen in a state where the execution of the actions 141*b* and 143*b* is in partial landing (e.g., when a parameter necessary for the actions 141*b* and 143*b* are not entered).

According to an embodiment, the execution service modules 141*a* and 143*a* may execute the actions 141*b* and 143*b* depending on a path rule. For example, the execution service modules 141*a* and 143*a* may be activated by the execution manager module 147, may receive an execution request from the execution manager module 147 depending on the path rule, and may execute functions of the apps 141 and 143 by performing the actions 141*b* and 143*b* depending on the execution request. When the execution of the actions 141*b* and 143*b* is completed, the execution service modules 141*a* and 143*a* may transmit completion information to the execution manager module 147.

According to an embodiment, when the plurality of actions 141*b* and 143*b* are respectively executed in the apps 141 and 143, the plurality of actions 141*b* and 143*b* may be executed sequentially. When the execution of one action (e.g., action 1 of the first app 141 or action 1 of the second app 143) is completed, the execution service modules 141*a* and 143*a* may open the next action (e.g., action 2 of the first app 141 or action 2 of the second app 143) and may transmit the completion information to the execution manager module 147. Here, it is understood that opening an arbitrary action is to transition a state of the arbitrary action to an executable state or to prepare the execution of an arbitrary action. In other words, when an arbitrary action is not opened, the corresponding action may not be executed. When the completion information is received, the execution manager module 147 may transmit the execution request for the next action (e.g., action 2 of the first app 141 or action 2 of the second app 143) to the execution service module. According to an embodiment, when the plurality of apps 141 and 143 are executed, the plurality of apps 141 and 143 may be sequentially executed. For example, when receiving the completion information after the execution of the last action (e.g., action 3 of the first app 141) of the first app 141 is completed, the execution manager module 147 may transmit the execution request of the first action (e.g., action 1 of the second app 143) of the second app 143 to the execution service module 143a.

According to an embodiment, when the plurality of actions 141b and 143b are executed in the apps 141 and 143, the result screen according to the execution of each of the executed plurality of actions 141b and 143b may be displayed on the display 120. According to an embodiment, only the part of a plurality of result screens according to the execution of the executed plurality of actions 141b and 143b may be displayed on the display 120.

According to an embodiment, the memory 140 may store an intelligence app (e.g., a speech recognition app) operating in conjunction with the intelligence agent 145. The app operating in conjunction with the intelligence agent 145 may receive and process the utterance of the user as a voice signal. According to an embodiment, the app operating in conjunction with the intelligence agent 145 may be operated by a specific input (e.g., an input through a hardware key, an input through a touchscreen, or a specific voice input) input through the input module 110.

According to an embodiment, the intelligence agent 145, the execution manager module 147, or the intelligence service module 149 stored in the memory 140 may be performed by the processor 150. The functions of the intelligence agent 145, the execution manager module 147, or the intelligence service module 149 may be implemented by the processor 150. It is described that the function of each of the intelligence agent 145, the execution manager module 147, and the intelligence service module 149 is the operation of the processor 150. According to an embodiment, the intelligence agent 145, the execution manager module 147, or the intelligence service module 149 stored in the memory 140 may be implemented with hardware as well as software.

According to an embodiment, the processor 150 may control overall operations of the user terminal 100. For example, the processor 150 may control the input module 110 to receive the user input. The processor 150 may control the display 120 to display an image. The processor 150 may control the speaker 130 to output the voice signal. The processor 150 may control the memory 140 to execute a program and may read or store necessary information.

In an embodiment, the processor 150 may execute the intelligence agent 145, the execution manager module 147, or the intelligence service module 149 stored in the memory 140. As such, the processor 150 may implement the function of the intelligence agent 145, the execution manager module 147, or the intelligence service module 149.

According to an embodiment, the processor 150 may execute the intelligence agent 145 to generate an instruction for launching an app based on the voice signal received as the user input. According to an embodiment, the processor 150 may execute the execution manager module 147 to launch the apps 141 and 143 stored in the memory 140 depending on the generated instruction. According to an embodiment, the processor 150 may execute the intelligence service module 149 to manage information of a user and may process a user input, using the information of the user.

The processor 150 may execute the intelligence agent 145 to transmit a user input received through the input module 110 to the intelligence server 200 and may process the user input through the intelligence server 200.

According to an embodiment, before transmitting the user input to the intelligence server 200, the processor 150 may execute the intelligence agent 145 to pre-process the user input. According to an embodiment, to pre-process the user input, the intelligence agent 145 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input and may search for a part in which the user voice is present, using the detected end-point. The AGC module may recognize the user input and may adjust the volume of the user input so as to be suitable to process the recognized user input. According to an embodiment, the processor 150 may execute all the pre-processing configurations for performance. However, in another embodiment, the processor 150 may execute a part of the pre-processing configurations to operate at low power.

According to an embodiment, the intelligence agent 145 may execute a wakeup recognition module stored in the memory 140 to recognize the call of a user. As such, the processor 150 may recognize the wakeup command of a user through the wakeup recognition module and may execute the intelligence agent 145 for receiving a user input when receiving the wakeup command. The wakeup recognition module may be implemented with a low-power processor (e.g., a processor included in an audio codec). According to an embodiment, when receiving a user input through a hardware key, the processor 150 may execute the intelligence agent 145. When the intelligence agent 145 is executed, an intelligence app (e.g., a speech recognition app) operating in conjunction with the intelligence agent 145 may be executed.

According to an embodiment, the intelligence agent 145 may include a speech recognition module for executing the user input. The processor 150 may recognize the user input for executing an action in an app through the speech recognition module. For example, the processor 150 may recognize a limited user (voice) input (e.g., an utterance such as "click" for performing a capture operation when a camera app is being executed) for performing an action such as the wakeup command in the apps 141 and 143 through the speech recognition module. The processor 150 may recognize and rapidly process a user command capable of being processed in the user terminal 100 through the speech recognition module by assisting the intelligence server 200. According to an embodiment, the speech recognition module of the intelligence agent 145 for executing a user input may be implemented in an app processor.

According to an embodiment, the speech recognition module (including the speech recognition module of a wake up module) of the intelligence agent 145 may recognize the user input, using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to an embodiment, the processor 150 may execute the intelligence agent 145 to convert the voice input of the user into text data. For example, the processor 150 may transmit the voice of the user to the intelligence server 200 through the intelligence agent 145 and may receive the text data corresponding to the voice of the user from the intelligence server 200. As such, the processor 150 may display the converted text data in the display 120.

According to an embodiment, the processor 150 may execute the intelligence agent 145 to receive a path rule from the intelligence server 200. According to an embodiment, the processor 150 may deliver the path rule to the execution manager module 147 through the intelligence agent 145.

According to an embodiment, the processor 150 may execute the intelligence agent 145 to transmit the execution result log according to the path rule received from the intelligence server 200 to the intelligence service module 149, and the transmitted execution result log may be accumulated and managed in preference information of the user of a persona module 149b.

According to an embodiment, the processor 150 may execute the execution manager module 147, may receive the path rule from the intelligence agent 145, and may execute the apps 141 and 143; and the processor 150 may allow the apps 141 and 143 to execute the actions 141b and 143b included in the path rule. For example, the processor 150 may transmit command information (e.g., path rule information) for executing the actions 141b and 143b to the apps 141 and 143, through the execution manager module 147; and the processor 150 may receive completion information of the actions 141b and 143b from the apps 141 and 143.

According to an embodiment, the processor 150 may execute the execution manager module 147 to transmit the command information (e.g., path rule information) for executing the actions 141b and 143b of the apps 141 and 143 between the intelligence agent 145 and the apps 141 and 143. The processor 150 may bind the apps 141 and 143 to be executed depending on the path rule through the execution manager module 147 and may deliver the command information (e.g., path rule information) of the actions 141b and 143b included in the path rule to the apps 141 and 143. For example, the processor 150 may sequentially transmit the actions 141b and 143b included in the path rule to the apps 141 and 143, through the execution manager module 147 and may sequentially execute the actions 141b and 143b of the apps 141 and 143 depending on the path rule.

According to an embodiment, the processor 150 may execute the execution manager module 147 to manage execution states of the actions 141b and 143b of the apps 141 and 143. For example, the processor 150 may receive information about the execution states of the actions 141b and 143b from the apps 141 and 143, through the execution manager module 147. For example, when the execution states of the actions 141b and 143b are in partial landing (e.g., when a parameter necessary for the actions 141b and 143b are not input), the processor 150 may deliver information about the partial landing to the intelligence agent 145, through the execution manager module 147. The processor 150 may make a request for an input of necessary information (e.g., parameter information) to the user, using the received information through the intelligence agent 145. For another example, when the execution state of each of the actions 141b and 143b is an operating state, the processor 150 may receive an utterance from the user through the intelligence agent 145. The processor 150 may transmit information about the apps 141 and 143 being executed and the execution states of the apps 141 and 143 to the intelligence agent 145, through the execution manager module 147. The processor 150 may transmit the user utterance to the intelligence server 200 through the intelligence agent 145. The processor 150 may receive parameter information of the utterance of the user from the intelligence server 200 through the intelligence agent 145. The processor 150 may deliver the received parameter information to the execution manager module 147 through the intelligence agent 145. The execution manager module 147 may change a parameter of each of the actions 141b and 143b to a new parameter, using the received parameter information.

According to an embodiment, the processor 150 may execute the execution manager module 147 to transmit parameter information included in the path rule to the apps 141 and 143. When the plurality of apps 141 and 143 are sequentially executed depending on the path rule, the execution manager module 147 may deliver the parameter information included in the path rule from one app to another app.

According to an embodiment, the processor may execute the execution manager module 147 to receive a plurality of path rules. The processor 150 may select a plurality of path rules based on the utterance of the user, through the execution manager module 147. For example, when the user utterance specifies a partial app 141 executing a partial action 141a but does not specify the other app 143 executing the remaining action 143b, the processor 150 may receive a plurality of different path rules, in which the same app 141 (e.g., a gallery app) executing the partial action 141a is executed and the different app 143 (e.g., a message app or Telegram app) executing the remaining action 143b is executed, through the execution manager module 147. For example, the processor 150 may execute the same actions 141b and 143b (e.g., the same successive actions 141b and 143b) of the plurality of path rules, through the execution manager module 150. When the processor 150 executes the same action, the processor 150 may display a state screen for selecting the different apps 141 and 143 respectively included in the plurality of path rules in the display 120, through the execution manager module 147.

According to an embodiment, the intelligence service module 149 may include a context module 149a, a persona module 149b, or a suggestion module 149c.

The processor 150 may execute the context module 149a to collect current states of the apps 141 and 143 from the apps 141 and 143. For example, the processor 150 may execute the context module 149a to receive context information indicating the current states of the apps 141 and 143 and may collect the current states of the apps 141 and 143 through the received context information.

The processor 150 may execute the persona module 149b to manage personal information of the user utilizing the user terminal 100. For example, the processor 150 may execute the persona module 149b to collect usage information and the execution result of the user terminal 100 and may manage the personal information of the user by using the collected usage information and the collected execution result of the user terminal 100.

The processor 150 may execute the suggestion module 149c to predict the intent of the user and may recommend an instruction to the user based on the intent of the user. For example, the processor 150 may execute the suggestion module 149c to recommend an instruction to the user depending on the current state (e.g., a time, a place, a situation, or an app) of the user.

Figure 3:
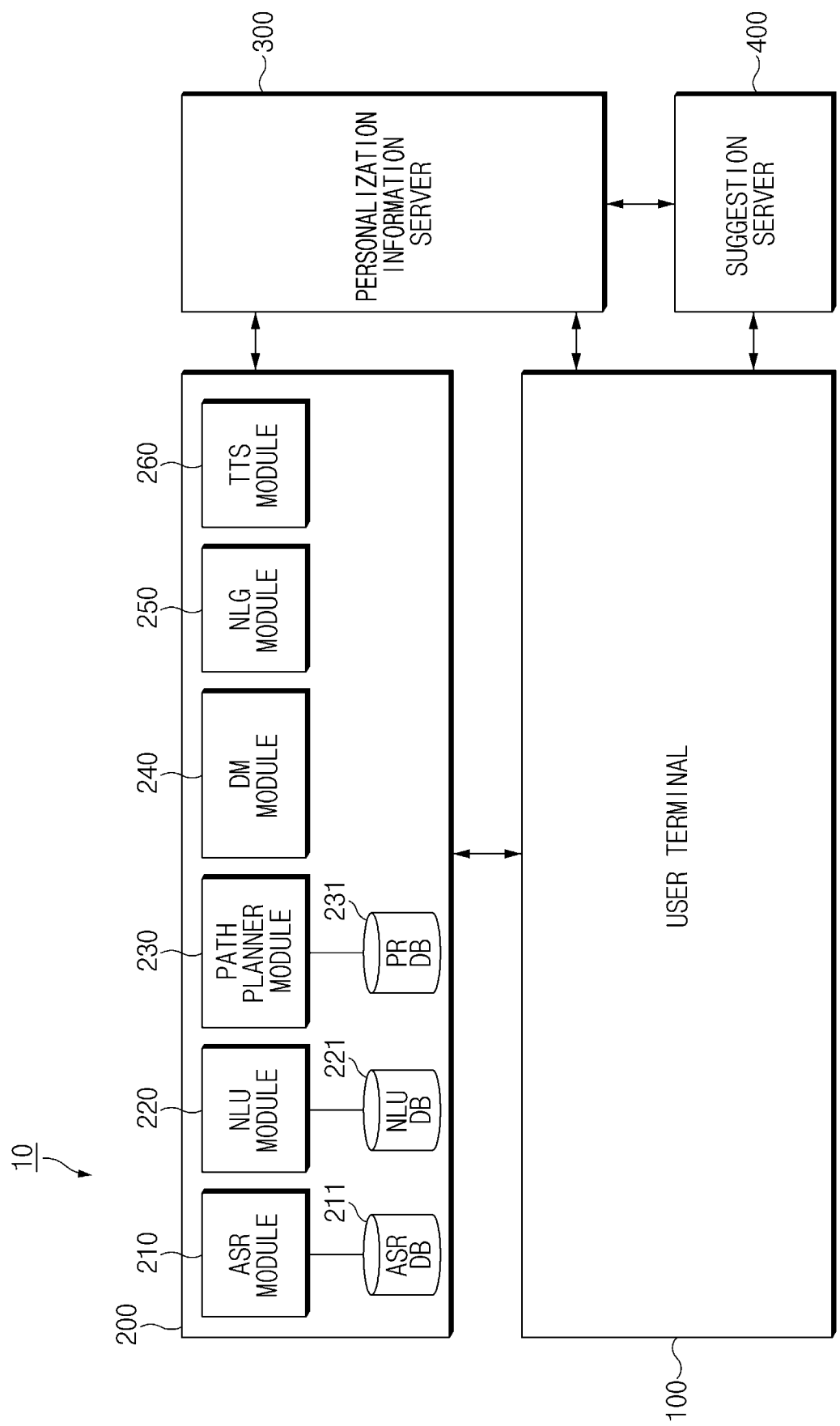
FIG. 3 is a block diagram illustrating an intelligence server of an integrated intelligence system, according to an embodiment of the disclosure.

FIG. 3 is a block diagram illustrating an intelligence server of an integrated intelligence system, according to an embodiment of the disclosure.

Referring to FIG. 3, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260. According to an embodiment, the intelligence server 200 may include a communication circuit, a memory, and a processor. The processor may execute an instruction stored in the memory to operate the ASR module 210, the NLU module 220, the path planner module 230, the DM module 240, the NLG module 250, or the TTS module 260. The intelligence server 200 may transmit or receive data (or information) to or from an external electronic device (e.g., the user terminal 100) through the communication circuit.

The NLU module 220 or the path planner module 230 of the intelligence server 200 may generate a path rule.

According to an embodiment, the ASR module 210 may change the user input received from the user terminal 100 to text data.

According to an embodiment, the ASR module 210 may convert the user input received from the user terminal 100 to text data. For example, the ASR module 210 may include a speech recognition module. The speech recognition module may include an acoustic model and a language model. For example, the acoustic model may include information associated with phonation, and the language model may include unit phoneme information and information about a combination of unit phoneme information. The speech recognition module may convert a user utterance into text data, using information associated with phonation and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and may determine which syntactic elements the divided units have. The semantic analysis may be performed by using semantic matching, rule matching, formula matching, or the like. As such, the NLU module 220 may obtain a domain, intent, or a parameter (or a slot) necessary to express the intent, from the user input.

According to an embodiment, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may grasp the meaning of words extracted from a user input by using linguistic features (e.g., syntactic elements) such as morphemes, phrases, and the like and may match the grasped meaning of the words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words, which are based for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action (e.g., at least one or more states) to be executed in the app, and a parameter necessary to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the action to be executed in the app, and a parameter necessary to execute the action based on the intent of the user input and the parameter to generate one path rule or a plurality of path rules. For example, the NLU module 220 may arrange the app to be executed and the action to be executed in the app by using information of the user terminal 100 depending on the intent of the user input in the form of ontology or a graph model to generate the path rule. For example, the generated path rule may be stored in a path rule database (PR DB) 231 through the path planner module 230. The generated path rule may be added to a path rule set of the DB 231.

According to an embodiment, the NLU module 220 may select at least one path rule of the generated plurality of path rules. For example, the NLU module 220 may select an optimal path rule of the plurality of path rules. For another example, when only a part of action is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 at a request for the user input. For example, the NLU module 220 may transmit one path rule corresponding to the user input to the user terminal 100. For another example, the NLU module 220 may transmit the plurality of path rules corresponding to the user input to the user terminal 100. For example, when only a part of action is specified based on the user utterance, the plurality of path rules may be generated by the NLU module 220.

According to an embodiment, the path planner module 230 may select at least one path rule of the plurality of path rules.

According to an embodiment, the path planner module 230 may deliver a path rule set including the plurality of path rules to the NLU module 220. The plurality of path rules of the path rule set may be stored in the PR DB 231 connected to the path planner module 230 in the table form. For example, the path planner module 230 may deliver a path rule set corresponding to information (e.g., OS information or app information) of the user terminal 100, which is received from the intelligence agent 145, to the NLU module 220. For example, a table stored in the PR DB 231 may be stored for each domain or for each version of the domain.

According to an embodiment, the path planner module 230 may select one path rule or the plurality of path rules from the path rule set to deliver the selected one path rule or the selected plurality of path rules to the NLU module 220. For example, the path planner module 230 may match the user intent and the parameter to the path rule set corresponding to the user terminal 100 to select one path rule or a plurality of path rules and may deliver the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter to generate the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user's intent grasped by the NLU module 220 is definite. For example, the DM module 240 may determine whether the user intent is clear, based on whether the information of a parameter is sufficient. The DM module 240 may determine whether the parameter grasped by the NLU module 220 is sufficient to perform a task. According to an embodiment, when the user intent is not clear, the DM module 240 may perform a feedback for making a request for necessary information to the user. For example, the DM module 240 may perform a feedback for making a request for information about the parameter for grasping the user intent.

According to an embodiment, the DM module 240 may include a content provider module. When the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. The information changed to the text form may be in the form of a natural language speech. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information in the text form to information of a voice form. The TTS module 260 may receive the information of the text form from the NLG module 250, may change the information of the text form to the information of a voice form, and may transmit the information of the voice form to the user terminal 100. The user terminal 100 may output the information in the voice form to the speaker 130.

According to an embodiment, the NLU module 220, the path planner module 230, and the DM module 240 may be implemented with one module. For example, the NLU module 220, the path planner module 230, and the DM module 240 may be implemented with one module, may determine the user intent and the parameter, and may generate a response (e.g., a path rule) corresponding to the determined user intent and parameter. As such, the generated response may be transmitted to the user terminal 100.

Figure 4:
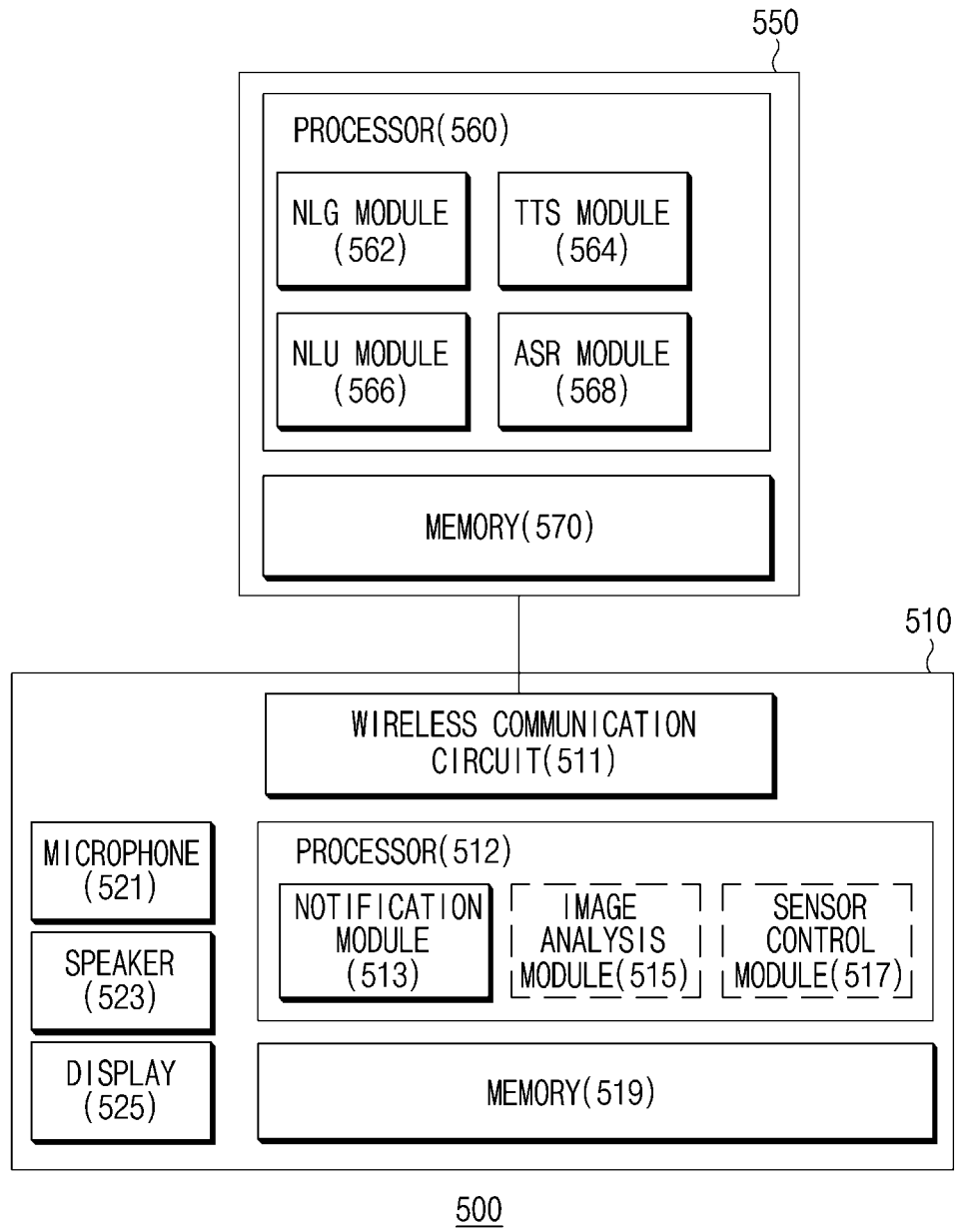
FIG. 4 is a diagram illustrating a configuration of an intelligence system according to an embodiment of the disclosure.

FIG. 4 is a diagram illustrating a configuration of an intelligence system 500 according to an embodiment.

Referring to FIG. 4, in an embodiment, the intelligence system 500 (e.g., the integrated intelligence system 10) may include at least one processor 512 or 560, which is a part of the electronic device 510 or which remotely communicates with the electronic device 510, and at least one memory 519 or 570, which is placed on the electronic device 510 or which resides outside the electronic device 510 while being operatively connected to the at least one processor 512 or 560. For example, the intelligence system 500 may include an electronic device 510 and a server 550 (e.g., the intelligence server 200).

In an embodiment, the electronic device 510 may include a wireless communication circuit 511, a memory 519, a processor 512, and a notification module 513 of the processor 512. The electronic device 510 may include a microphone 521 (e.g., the microphone 111 in FIG. 2), a speaker 523 (e.g., the speaker 130 in FIG. 2), and a display 525 (e.g., the display 120 of FIG. 2). In various embodiments, the processor 512 may further include an image analysis module 515 and a sensor control module 517.

For example, the processor 512 may execute instructions stored in the memory 519 to operate the notification module 513, the image analysis module 515, and the sensor control module 517. Modules described in various embodiments of the disclosure may be implemented by hardware or software. In various embodiments of the disclosure, it is understood that the operation executed by the notification module 513, the image analysis module 515, and the sensor control module 517 is the operation executed as the processor 519 executes instructions stored in the memory 519.

In an embodiment, the electronic device 510 may communicate with the server 550 through the wireless communication circuit 511. The electronic device 510 may transmit a voice input (e.g., utterance) received from a user, to the server 550 through the wireless communication circuit 511.

In an embodiment, when the electronic device 510 receives a message from an external device (not illustrated), the electronic device 510 may generate a notification for the message. For example, the notification module 513 may generate the notification for the message received from the wireless communication circuit 511.

In an embodiment, the notification module 513 may generate a notification based on information associated with the message. For example, the information associated with the message may be included in meta data of the message or a message body. The information associated with the message may include at least one of a sender (e.g., a name or a contact) of the message, the content of the message (e.g., a text included in the message), and a parameter (e.g., a parameter extracted from the sender's voice input). In addition, the information associated with the message may include information (e.g., information included in meta data of the attached content) associated with the attached content. The electronic device 510 may generate a notification including information about what content the sent message contains or who sent the message, based on information associated with the message.

For another example, the notification module 513 may generate a notification including information about which attached file has been transmitted using information about the content file attached to the message. The notification may include information such as the type of the content file and the details of the content. The information about the content file may be included in the meta data of the content file or may be included in the analysis information generated by a separate analysis module.

According to an embodiment, the notification may be displayed on the display 525 of the electronic device 510 in the message form or may be output through the speaker 523 in the voice form.

In various embodiments, the notification may include information about a message. Accordingly, a user may determine the content for the message and the intent of sending the message through the notification without performing an additional operation (e.g., an operation of directly identifying a message).

In various embodiments, instructions for operating the notification module 513 may be stored in the memory 570. The instructions may be included in a specific application. For example, the instructions may be included in a speech recognition application providing speech recognition. For another example, the instructions may be included in a messaging application providing a message service.

In various embodiments, data may be attached to the message. For example, content files such as image data, video data, and audio data may be attached to the message.

In various embodiments, the image analysis module 517 may analyze an image file and may extract information associated with the image file. For example, the image analysis module 517 may analyze image data attached to the message and may extract context information associated with the image data. For example, the context information associated with the image data may include information associated with image data such as the time of generating an image, a place where the image has been generated, and the name of a person included in the image.

In various embodiments, the sensor control module 517 may control at least one sensor included in the electronic device 510. For example, the sensor control module 517 may determine whether a user is in proximity to the electronic device 510, using at least one sensor.

For example, when the electronic device 510 includes a proximity sensor, the electronic device 510 may determine whether the user is present in proximity to the electronic device 510, using the proximity sensor. For example, in the case where the electronic device 510 includes an illuminance sensor, the electronic device 510 may determine that the user is close to the electronic device 510 when the intensity of light detected through the illuminance sensor is low even though the current time is daytime.

In an embodiment, the server 550 may include a processor 560 and a memory 570. The processor 560 may include an NLG module 562 (e.g., the NLG module 250 of FIG. 3), a TTS module 564 (e.g., the TTS module 250 of FIG. 3), an NLU module 566 (e.g., the NLU module 220 of FIG. 3), and an ASR module 568 (e.g., the ASR module 210 of FIG. 3). Similarly to the intelligence server 200 of FIG. 3, the server 550 may receive a user's voice input (e.g., an utterance) from the electronic device 510 and may provide a specified service by replying to the user's input.

Figure 5:
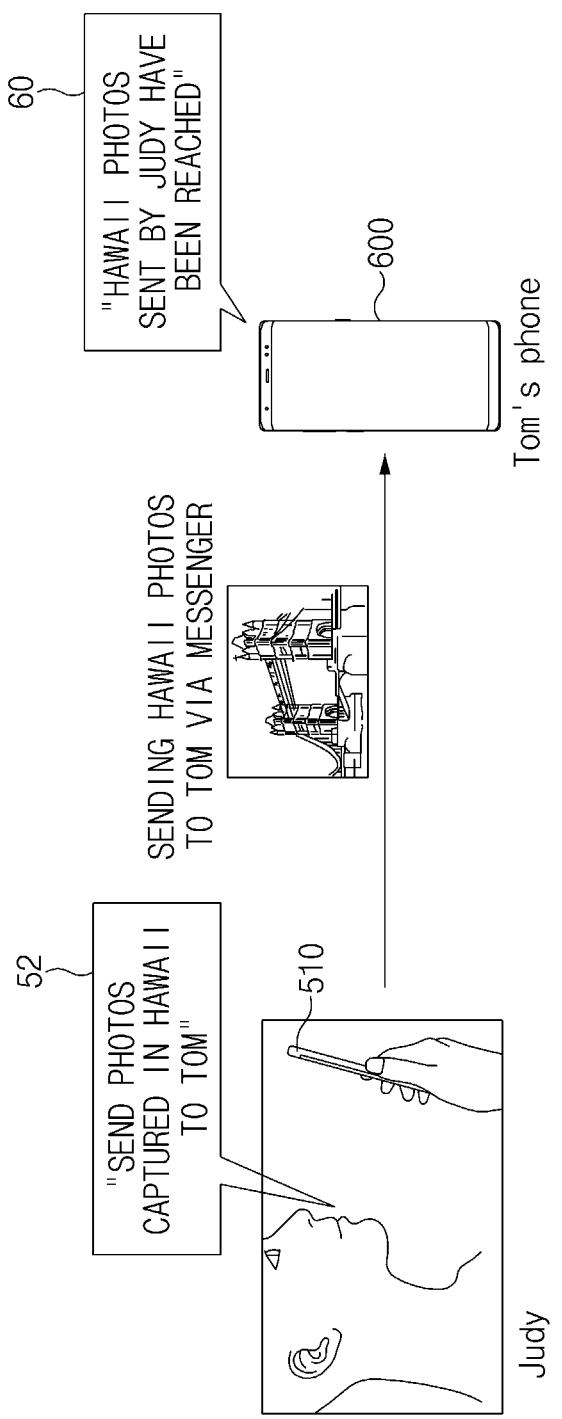
FIG. 5 is a diagram for describing an embodiment of generating a notification message using a voice input according to various embodiments of the disclosure.
Figure 6:
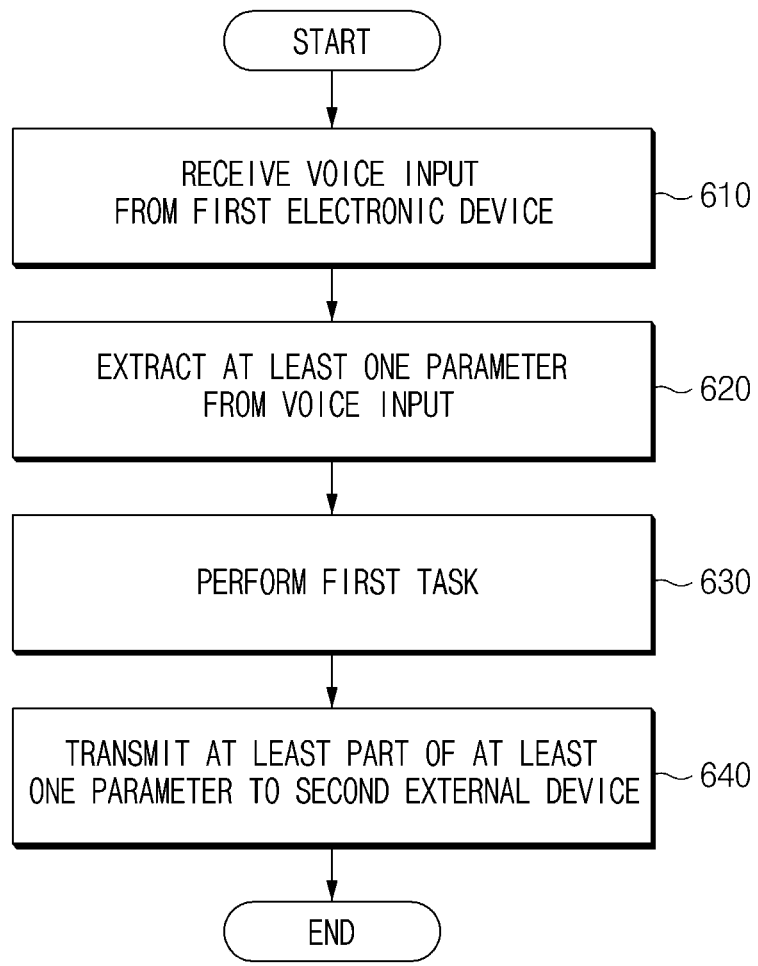
FIG. 6 is a flowchart of a method of providing a notification message according to an embodiment of the disclosure.

FIG. 5 is a diagram for describing an embodiment of generating a notification message using a voice input according to various embodiments of the disclosure. FIG. 6 is a flowchart of a method of providing a notification message according to an embodiment of the disclosure. Hereinafter, a method of providing a notification message according to an embodiment will be described with reference to FIGS. 5 and 6.

Referring to FIG. 5, an electronic device 510 may receive a voice input 52 (e.g., an utterance) of a user (e.g., Judy) making a request for a message transmission. For example, the transmission of a message to which an image file (e.g., a photo) is attached may be requested. The electronic device 510 may transmit the corresponding message to an external device 600 in response to the message sending request. The external device 600 may generate a notification message 60 associated with the received message, and may output a notification message 60 as a voice through a speaker (e.g., the speaker 523 in FIG. 4).

Referring to FIG. 6, a method of providing a notification message according to an embodiment may include operation 610 to operation 640. For example, operation 610 to operation 640 may be performed by the intelligence system 500 illustrated in FIG. 4. For example, operation 610 to operation 640 may be respectively implemented with instructions capable of being performed (or executed) by the at least one processor (e.g., the processor 512 or the processor 560 of FIG. 5) of the intelligence system 500. For example, the instructions may be stored in a computer-readable recording medium or at least one memory (e.g., the memory 519 or the memory 570 of FIG. 4). Hereinafter, the reference numerals of FIG. 4 may be cited to describe operation 610 to operation 640, and a description the same as described with reference to FIG. 4 may not be repeated here.

According to various embodiments, the intelligence system 500 (e.g., the intelligence system 500 of FIG. 4) may include the electronic device 510 (e.g., the electronic device 510 of FIG. 4). The electronic device 510 may include the wireless communication circuit 511, the microphone 521, and the speaker 523. The intelligence system 500 may be a part of the electronic device 510 or may include at least one processor 512 or 560 that communicates remotely with the electronic device 510. While the intelligence system is operatively connected to the at least one processor, the intelligence system may include at least one memory 519 or 570 residing on or outside the electronic device 510. When being executed, instructions stored in the at least one memory 519 or 570 may cause the at least one processor 512 and 560 to perform operation 610 to operation 640.

In operation 610, the intelligence system 500 may receive a voice input through the microphone 521 of the electronic device 510. The voice input may include a request to perform a task, using the electronic device 510. For example, the task may be associated with transmitting data to the external device 600. In various embodiments, the task may include transmitting data through a message or email.

Referring to FIG. 5, in an embodiment, user "Judy" may utter "send the photo captured in Hawaii to Tom". The electronic device 510 may receive a voice input 52 corresponding to the utterance through the microphone 521. For example, the voice input 52 may include a request for a task to send messages and image files to the electronic device (e.g., the external device 600) of Tom.

In operation 620, the intelligence system 500 may extract at least one parameter from the voice input. According to various embodiments, operation 620 may be performed by the processor 560 of the server 550. In operation 630, the intelligence system 500 may perform the task, using the wireless communication circuit 511 of the electronic device 510. For example, the task may be associated with sending a message to the external device 600.

For example, the parameter may be referred to as a parameter used to perform a task included in the voice input. Referring to FIG. 5, the parameter such as a recipient of a message, text information to be attached to the message, file information to be attached to the message, and the like may be used to perform the message sending task included in the voice input 52.

In various embodiments, the parameter may be referred to as a parameter used when the intelligence server 200 of FIG. 3 generates a path rule. The intelligence system 500 may generate an instruction (e.g., a path rule) that causes the electronic device 510 to send a message based on the extracted parameter. For example, the server 550 may generate a path rule including the extracted parameter and may transmit the generated path rule to the electronic device 510.

Referring to FIG. 5, the server 550 may extract a 'Hawaii photo' and 'Tom' as parameters from the voice input 52. The server 550 may generate a path rule for executing a task such as 'executing a message application, attaching a Hawaii photo to a message, and sending the message to the electronic device of Tom' and then may transmit the path rule to the electronic device 510. The electronic device 510 may execute a message application depending on the received path rule and may perform a message sending operation on the message application. In addition, to attach a Hawaii photo, the electronic device 510 may execute a gallery application and may search for photos captured in Hawaii.

In operation 640, the intelligence system 500 may transmit at least part of the extracted parameters to the external device 600. For example, when sending a message to the external device 600, the electronic device 510 may transmit a parameter corresponding to context information of the message together. According to various embodiments, operation 640 may be performed by the processor 512 of the electronic device 510. The external device 600 may generate a notification message for the message based on the received parameter. In various embodiments, operation 630 and operation 640 may be performed substantially simultaneously.

Referring to FIG. 5, the electronic device 510 may transmit a 'Hawaii photo' to the external device 600 among the 'Hawaii photo' and 'Tom', which are extracted parameters. The electronic device 510 may determine a parameter associated with the context information of a message among the extracted parameters as the 'Hawaii photo'. When transmitting a message to which the Hawaii photo is attached, the electronic device 510 may transmit a parameter of the 'Hawaii photo'.

The external device 600 may generate a notification message 60, using the received parameter. For example, the external device 600 may generate a notification message 60 such as 'Hawaii photos have been reached'. The external device 600 may output the notification message 60 through a speaker. User 'Tom' may know that a photo captured in Hawaii is attached to the message, through the notification message 60 without directly identifying the received message.

In various embodiments, the electronic device 510 may transmit, to the external device 600, information associated with the message itself, such as a sender of a message (e.g., a chat message or an email), the creation time of the message, and the like. For example, the information associated with the message itself may be included in the meta data of the message.

Referring to FIG. 5, the electronic device 510 may transmit 'Judy', which is information about the sender of the message, to the external device 600. The electronic device 510 may transmit a 'Hawaii photo', which is a parameter extracted from the voice input 52, to the external device 600. The external device 600 may generate a notification message 60 such as 'Hawaii photos sent by Judy have been reached'.

In various embodiments, the intelligence system 500 may transmit the at least one parameter as meta data of a message (e.g., a chat message or an email). The external device 600 may extract parameter information from the received meta data and may generate a notification message.

In various embodiments, the intelligence system 500 may transmit the at least one parameter as the part of the content of the message (e.g., a chat message or an email). For example, the at least one parameter may be attached to a message or part of an email as text data. The external device 600 may output the received message or part of the content of the email, as a notification message through the speaker 523.

In various embodiments, the intelligence system 500 may determine whether to transmit the at least one parameter as meta data of the message (e.g., a chat message or an email) or as the part of the content of the message, based on the type of external device 600, For example, the type of external device 600 may include the type of the message application stored in the external device 600, and the type of the message service to which the external device 600 is subscribed. When the type of the message application stored in the external device 600 is the same as the type of message application of the electronic device 510 and when the external device 600 and the electronic device 510 are subscribed to the same message service, the intelligence system 500 may transmit a parameter as meta data of a message. The external device 600 may interpret meta data in a format provided by the message application or message service, and may obtain a parameter from the meta data. On the other hand, when the type of the external device 600 is different, the parameter may be transmitted as the part of the content of the message. The external device 600 may obtain a parameter from the content of the message and may generate a notification message. In various embodiments, a message application or a message service available to subscription may vary depending on the type of the external device 600. In this case, the intelligence system 500 may determine whether to transmit the parameters as meta data of the message (e.g., a chat message or an email) or as part of the content of the message, depending on the type of the external device 600.

Figure 7:
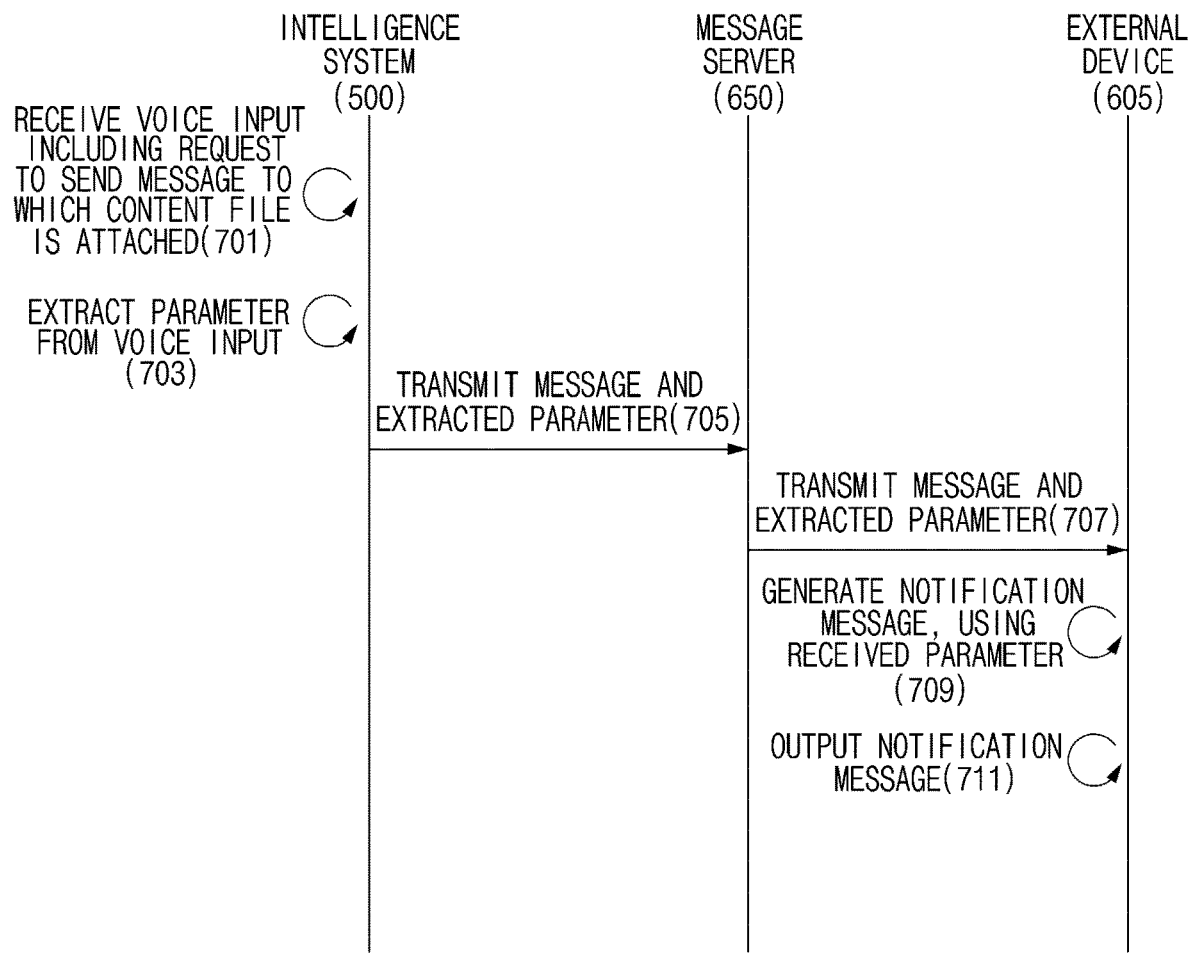
FIG. 7 is a sequence diagram, in which a method of providing a notification message through a message service is performed, according to various embodiments of the disclosure.

FIG. 7 is a sequence diagram for describing a method of providing a notification message according to various embodiments of the disclosure.

In various embodiments, the intelligence system 500 may provide a message service. The message service may be referred to as a service providing a message exchange service between users. The message may be referred to as various types of messages including text messages such as SMS and MMS, other texts such as email, chat messages, or the like, and files such as images and videos. For example, the processor 512 of the electronic device 510 may provide a message service. For example, the intelligence system 500 may communicate with a message server 650 through the wireless communication circuit 511. The intelligence system 500 may transmit a message to an external device 605 (e.g., the external device 600 of FIG. 5) registered in the message service through the message server 650. In various embodiments, the external device 605 may be referred to as an electronic device (e.g., the electronic device 510 in FIG. 4) or an intelligence system (e.g., intelligence system 500 in FIG. 4) registered in the message service.

Referring to FIG. 7, the intelligence system 500 according to an embodiment may receive a voice input to request the transmission of a message, to which a content file is attached, through a message service (701). For example, the electronic device 510 may receive a voice input and may transmit the voice input to the server 550. The intelligence system 500 may extract at least one parameter from the voice input (703). For example, the server 550 may extract a parameter from the voice input. The at least one parameter may be associated with context information of a message to be transmitted.

For example, the message may include the content file. The content file may include an image file, an audio file, or a video file. The at least one parameter may be referred to as context information about the content file. The context information about the content file may be referred to as information associated with the content file, such as the type of the content file, the name of the content file, the creator/creation time/place of creation of the content file, and the like.

In an embodiment, the message server 650 may receive a message and the extracted parameter (705). The message server 650 may transmit the message and the extracted parameter to the external device 605 (707). For example, the parameter may be included and transmitted in meta data of the message, or may be included and transmitted in the part of the contents of the message. Alternatively, the parameter may be included and transmitted in the meta data of the content file attached to the message.

In an embodiment, the external device 605 may generate a notification message, using the received parameter (709). The external device 605 may output the generated notification message (711). For example, the external device 605 may generate a notification from at least part of the meta data of a message, the content of a message, or the meta data of the content file. For example, the external device 605 may generate a notification message such as "'some content files' have been received from 'some senders'", using the information associated with the message including at least one of the sender of the message, the type/content/place of creation/creation time of the content file, or a parameter.

In various embodiments, the message may include various pieces of information. For example, various pieces of information may be transmitted through a message such as Internet URL, schedule information of a message sender, contact information of a specific person, or the like. In this case, context information about various pieces of information included in the message may be provided to a user through a notification message.

In an embodiment, the message may include URL information. When receiving a message including URL information, the external device 605 may generate a notification message including context information associated with URL such as the content of a web page indicated by URL.

For example, a user may utter "search for reviews for movie 1987 from portal site 'A' and then send the reviews to Tom." The electronic device 510 of the intelligence system 500 may access portal site 'A' through a web browser (e.g., a web application or an application provided by a specific portal) and then may search for the reviews on movie 1987. The electronic device 510 may transmit a message, to which URL of a web screen including the found results is attached, to the external device 605. At this time, the electronic device 510 may transmit parameters of 'portal site A', 'search', 'movie 1987', and 'reviews' from the user's utterance together with the message. The external device 605 may generate a notification message such as 'reviews on movie 1987 found in portal site A are arrived from Judy through a message', using the received parameters.

Figure 8:
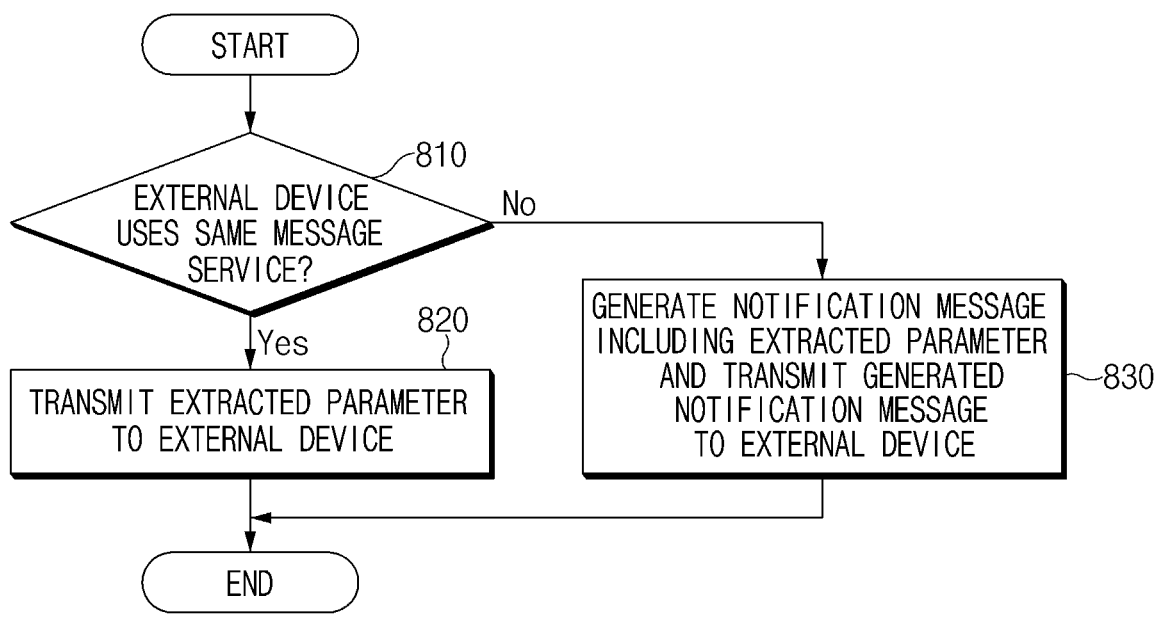
FIG. 8 is a flowchart of a method of providing a notification message through a message service according to various embodiments of the disclosure.

FIG. 8 is a flowchart of a method of providing a notification message through a message service according to various embodiments of the disclosure.

In various embodiments, the intelligence system 500 may determine whether the external device 605 scheduled to receive a message uses the same message service. Operation 810 to operation 830 of FIG. 8 may be performed by the electronic device 510 or the server 550 of the intelligence system 500 after operation 620 of FIG. 6 or after operation 703 of FIG. 7. Hereinafter, operation 810 to operation 830 of FIG. 8 may be described as being performed by the intelligence system 500. However, operation 810 to operation 830 of FIG. 8 may be performed by the processor 512 of the electronic device 510 or the processor 560 of the server 550.

In operation 810, the intelligence system 500 may determine whether the external device 605 receiving the message provides the same service as the message service provided by the intelligence system 500.

In an embodiment, the message service may be provided through a specific application (e.g., a chat application, an email application, or the like). When the intelligence system 500 transmits a message through an application stored in the electronic device 510, the intelligence system 500 may determine whether the external device 600 stores the same application (or compatible application).

In an embodiment, when transmitting a message on a message service accessed through the wireless communication circuit 511, the electronic device 510 may determine whether the external device 600 has the authority for the same message service.

For example, the intelligence system 500 may determine whether the external device 605 has an account of the message service, through the message server 650. Alternatively, the intelligence system 500 may determine whether messages have been transmitted and received with the external device 605, through the message service.

In operation 820, when the external device 605 uses the same message service, the intelligence system 500 may directly transmit the extracted parameter to the external device 605. The external device 605 may generate a notification message, using the extracted parameter. For example, when a parameter is transmitted as meta data of a message, the external device 605 may use the message of the same format provided by the same message service, and thus may interpret the meta data to obtain a parameter.

In operation 830, when the external device 605 does not use the same message service, the intelligence system 500 may generate a notification message including the extracted parameter and may transmit the generated notification message to the external device 605. When the external device 605 does not use the same message service, the external device 605 may not include an operation of reconstructing a parameter and generating a notification message. Accordingly, the intelligence system 500 may directly generate a notification message and may transmit the completed notification message to the external device 605. The notification message may be transmitted together with the message body corresponding to the notification message. For example, the notification message may be transmitted in the form of text data. In this case, the external device 605 may convert the received text data into a voice signal and may output the voice signal through a speaker.

Figure 9A:
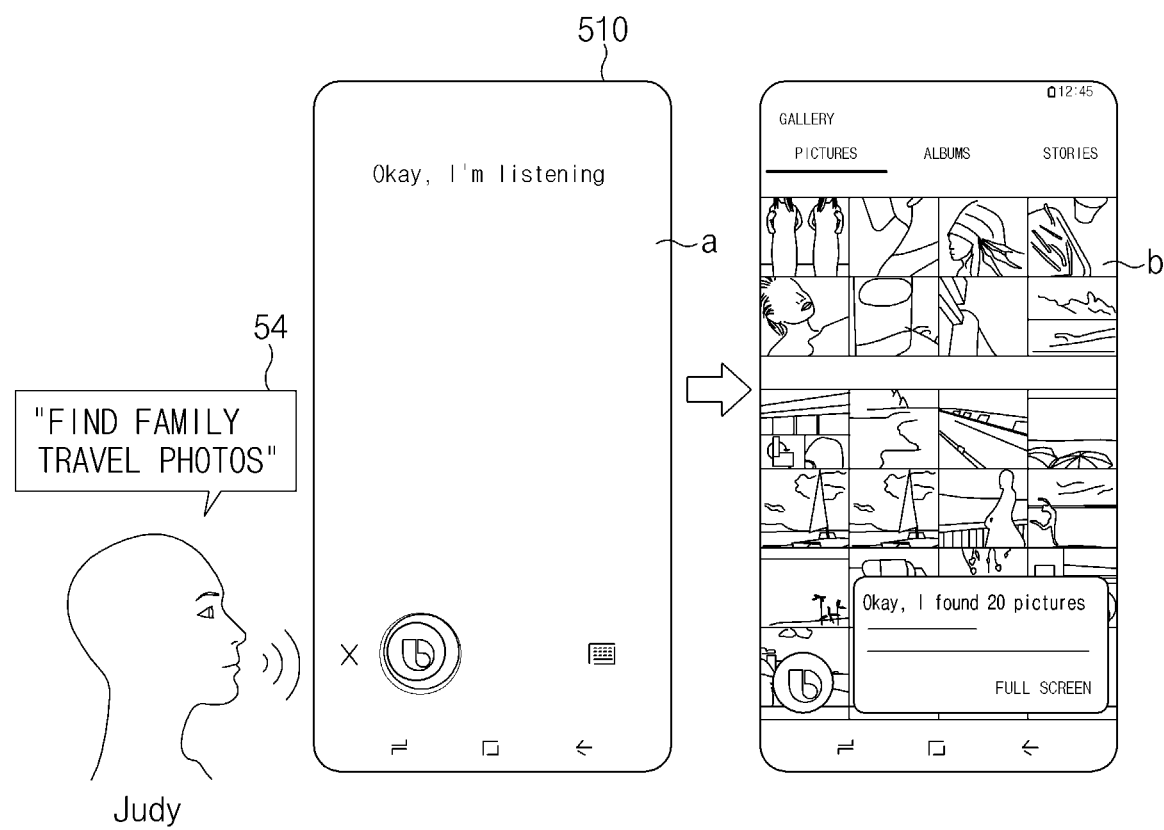
FIGS. 9A and 9B illustrate an embodiment for describing a method of generating a notification message according to various embodiments.
Figure 9B:
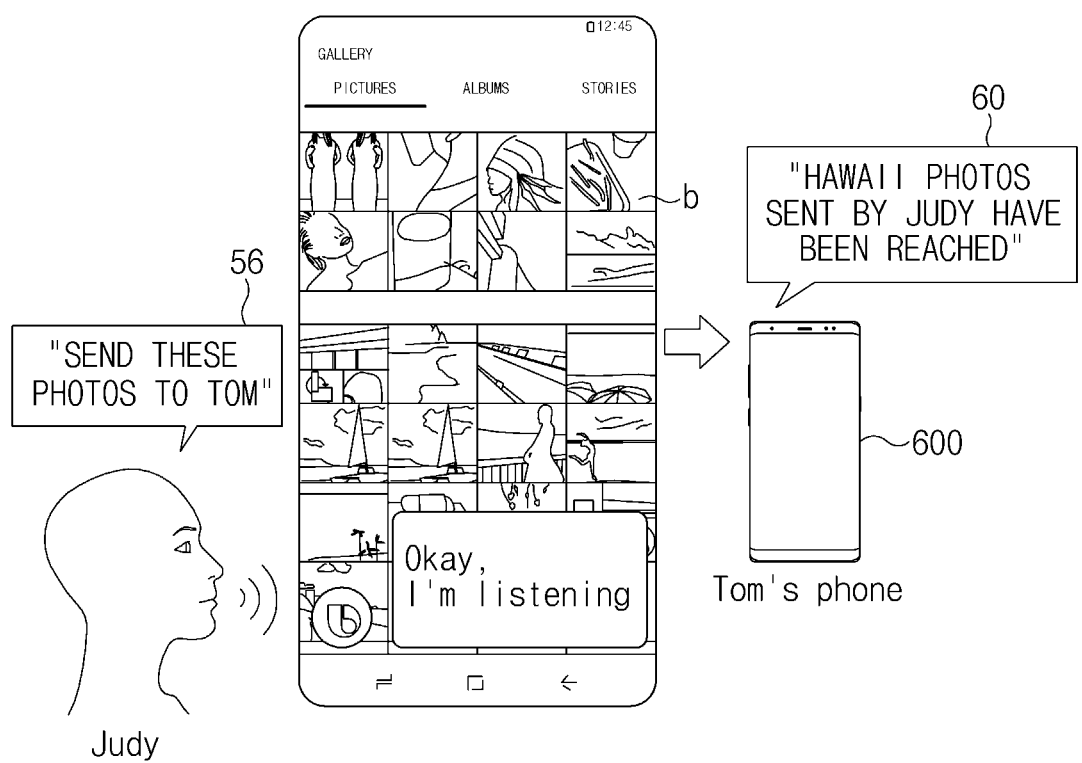

FIGS. 9A and 9B illustrate an embodiment for describing a method of generating a notification message according to various embodiments.

Referring to FIGS. 9A and 9B, in an embodiment, user 'Judy' may utter 'find family travel photos'. The electronic device 510 of the intelligence system 500 may receive a first voice input 54 corresponding to the utterance through a microphone 521. The electronic device 510 may transmit the received first voice input 54 to the server 550. The server 550 may determine the user's intent for the first voice input 54 and may generate a command (e.g., a path rule) corresponding to the first voice input 54. For example, a command may be generated such as 'search for photos tagged with a family in a gallery application'. The server 550 may transmit the generated command to the electronic device 510.

When the electronic device 510 receives the command from screen (a), the electronic device 510 may execute a gallery application and may search for photos tagged with a family among stored photos. For example, referring to screen (b), the electronic device 510 may display the found photos on the display 525.

In an embodiment, user 'Judy' may identify the printed photos and may utter 'send these photos to Tom' on screen (b). The electronic device 510 of the intelligence system 500 may receive a second voice input 56 corresponding to the utterance through the microphone 521. Like the first voice input 54, the second voice input 56 may be transmitted to the server 550. In an embodiment, the second voice input 56 may include a message sending request, and thus the intelligence system 500 (e.g., the electronic device 510 or the server 550) may generate a message to be transmitted to an external device of Tom, as described above in FIGS. 5 to 7. The parameters capable of being extracted from the second voice input 56 may be 'Tom' and 'these photos'.

In various embodiments, when the voice input including the message sending command includes directives (e.g., this, that, and the like), the intelligence system 500 may extract context information from a voice input received prior to the voice input. For example, 'these photos' in the second voice input 56 includes directives, and thus the intelligence system 500 may extract context information from the previous voice input. In various embodiments, the intelligence system 500 may extract context information about a content file to be attached, from a voice input received prior to a voice input (e.g., the second voice input 56) including the message sending command. For example, the intelligence system 500 may extract a parameter from another voice input received within the specified number of times or within a specified time rather than a voice input including the message sending command.

For example, other voice inputs may be temporarily stored on the message service. For example, the other voice inputs may be temporarily stored in a storage space of a specific application stored in the memory 519 of the electronic device 510. Alternatively, the other voice inputs may be temporarily stored in the memory 570 of the server 550 providing a speech recognition service. When the specified number of times or the specified time elapses, the electronic device 510 or the server 550 may delete other temporarily-stored voice inputs.

For example, the intelligence system 500 may extract a parameter from the first voice input 54 received before the second voice input 56. The intelligence system 500 may extract parameters of 'family' and 'travel' from the first voice input 54. The intelligence system 500 may transmit the parameters to the external device 605. For example, the external device 605 may generate and output a notification message of 'a family trip photo has been received from Judy' using the parameters.

Figure 10:
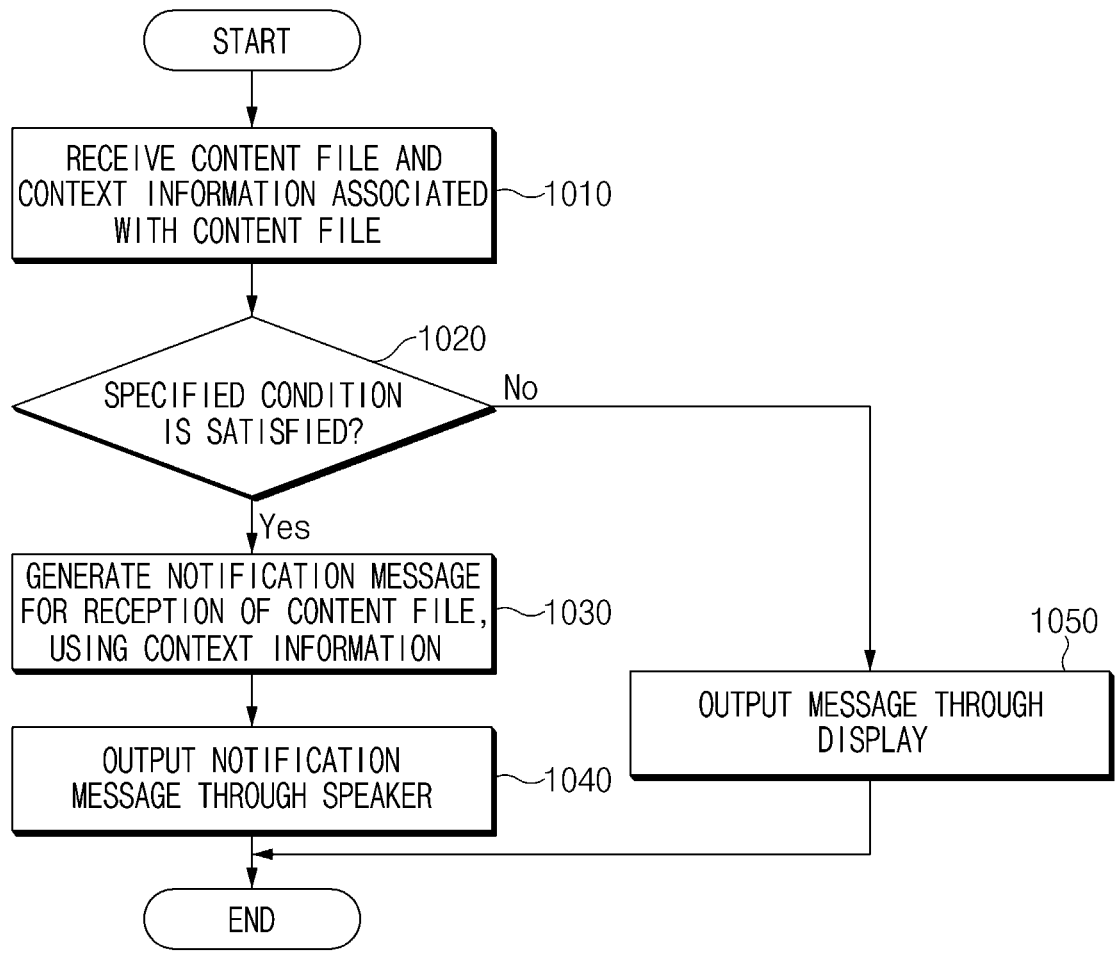
FIG. 10 is a flowchart of a method of outputting a notification message according to various embodiments.

FIG. 10 is a flowchart of a method of outputting a notification message according to various embodiments.

Referring to FIG. 10, a method of outputting a notification message according to an embodiment may include operation 1010 to operation 1050. For example, operation 1010 to operation 1050 may be performed by the external device 600 of FIG. 5 or the external device 605 of FIG. 7. The electronic device performing operation 1010 to operation 1050 may be referred to as a receiver-side electronic device that receives a message.

In various embodiments, the external device 600 may be referred to as the electronic device 510 included in the intelligence system 500 of FIG. 4. Hereinafter, operation 1010 to operation 1050 may be described as being performed by the electronic device 510, but may not be limited thereto. For example, each operation among operation 1010 to operation 1050 may be respectively implemented with instructions capable of being performed (or executed) by the at least one processor (e.g., the processor 512 of FIG. 4) of the electronic device 510. For example, the instructions may be stored in a computer-readable recording medium or at least one memory (e.g., the memory 519 of FIG. 4). Hereinafter, the reference numerals of FIG. 4 may be cited to describe operation 1010 to operation 1050, and a description the same as described with reference to FIG. 4 may not be repeated here.

In operation 1010, the electronic device 510 may receive a message including a content file, and context information associated with the content file together from an external electronic device (e.g., the intelligence system 500) through the wireless communication circuit 511.

For example, the content file may include an image file, an audio file, and a video file. For example, the context information may be referred to as information about the content file. For example, the context information may include a parameter extracted by the external device from a user's voice command for transmitting a message including the content.

In operation 1020, the electronic device 510 may determine whether a specified condition is satisfied. In an embodiment, the specified condition may be a condition of determining whether a user may not look at the display 525 of the electronic device 510. In various embodiments, the electronic device 510 may include at least one sensor (e.g., the sensor module 1576 of FIG. 15). The electronic device 510 may determine whether a user of the electronic device 510 is close to the electronic device 510, using at least one sensor. For example, when it is detected that the user is away from the electronic device 510 by a predetermined distance or more, the electronic device 510 may determine that the specified condition is satisfied. For example, when it is detected that the electronic device 510 is held by a user, the electronic device 510 may determine that the specified condition is not satisfied. In various embodiments, while the specified application is being executed, the electronic device 510 may determine that the specified condition is satisfied. For example, the electronic device 510 may determine that the user is driving while a navigation application is being executed. The electronic device 510 may determine that the user may not look at the display of the electronic device 510.

According to various embodiments, when it is determined that the specified condition is satisfied (Yes), in operation 1030, the electronic device 510 may generate a notification message for reception of the content file, using the context information (e.g., the creator/generation time/place of creation of the content file, or the like). For example, the context information may include at least one parameter extracted in operation 620 of FIG. 6 described above. The parameter may be included in context information and may be received by the electronic device 510. The electronic device 510 may generate a notification message, using the parameter received from an external device.

In operation 1040, the electronic device 510 may output the generated notification message as a voice through a speaker. Even though a user does not look at a screen, the user may receive information about the content file attached to the message through the output notification message. In an embodiment, the received message may be also output through the display 525.

In various embodiments, the electronic device 510 may determine whether there is at least one speaker (e.g., a smart speaker) connected to the electronic device 510 through the wireless communication circuit 511. When the connected speaker is present, the electronic device 510 may transmit a control signal and/or notification message to the smart speaker such that the notification message may be played through the smart speaker. For example, as well as the electronic device 510, a notification message may be output through a smart speaker installed in a user's space.

According to various embodiments, when it is determined that the specified condition is not satisfied (No), in operation 1050, the electronic device 510 may display the received message through the display 525.

Figure 11:
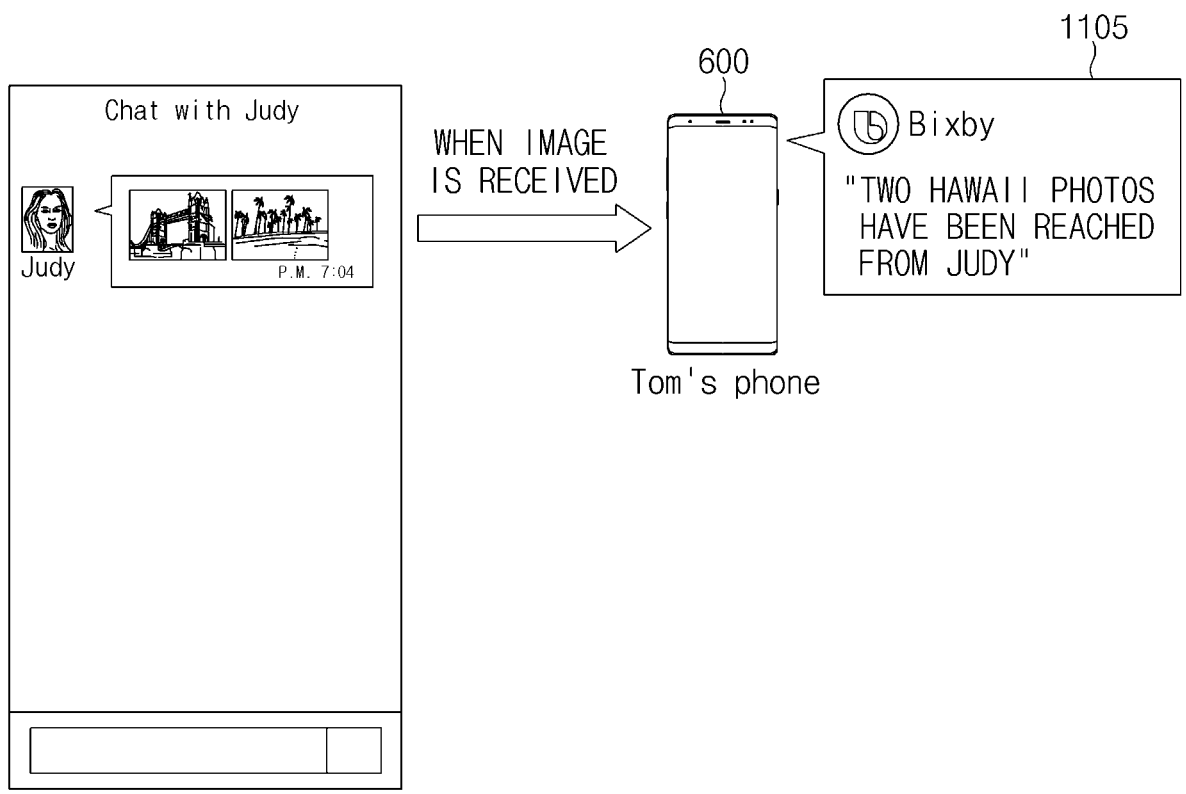
FIG. 11 illustrates an example of an electronic device receiving a message including a content file, in various embodiments.
Figure 12:
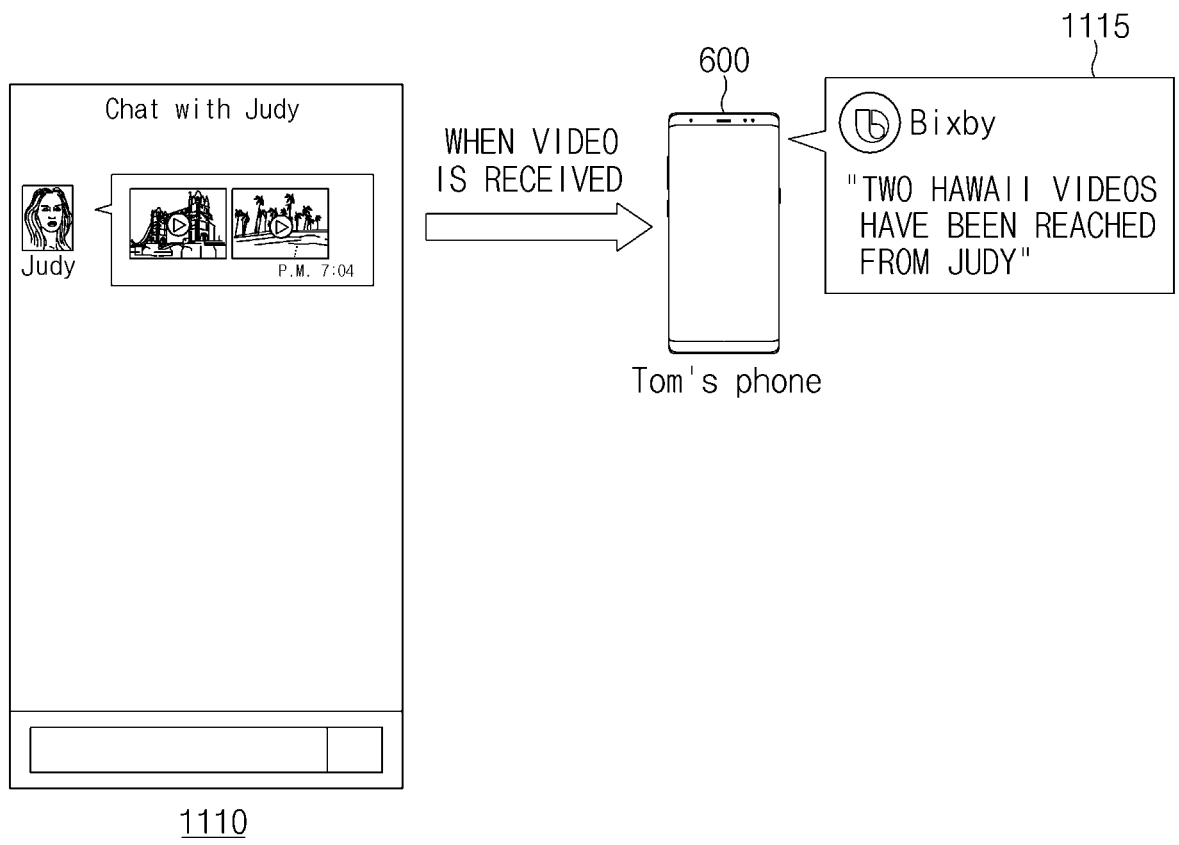
FIG. 12 illustrates an example of meta data included in a content file in various embodiments.

FIGS. 11 and 12 illustrate an example of an electronic device 600 receiving a message including a content file, in various embodiments.

Referring to FIG. 11, screen 1101 and screen 1110 may be displayed on a display of a sender-side electronic device (e.g., the electronic device 510 of FIG. 4) For example, screen 1101 may illustrate that the sender-side electronic device transmits an image file; screen 1110 may illustrate that the electronic device of the sender-side transmits a video file. The electronic device 600 may receive a message including a content file from the sender-side electronic device. The electronic device 600 may be referred to as a receiver-side electronic device (e.g., the electronic device 510 of FIG. 4 or the external device 600 of FIG. 5).

In various embodiments, the electronic device 600 may generate a notification message by further adding additional information to context information received in connection with a message. For example, the additional information may be included in meta data of the content file or may be included in analysis information about the content file. For example, the additional information may include various pieces of information associated with the content file, such as the creator/generation time/place of creation/size of the content file, or the like.

Referring to screen 1101, the electronic device 600 according to various embodiments may receive a message to which an image file is attached, and may generate a notification message 1105 related to the message.

In various embodiments, the electronic device 600 may generate a notification message using meta data of an image file. Referring to Table 1 below, an example of meta data of an image file is illustrated. For example, the electronic device 600 may generate a notification message, using information about a location where an image file has been created from meta data, a date on which the image file has been created, a time at which the image file has been created, and the like.

TABLE 1

| Tag | Value |
| --- | --- |
| Manufacturer | CASIO |
| Model | QV-4000 |
| Orientation (rotation) | top-l ett [9 possible values |
| Software | Ver1. 01 |
| Date and time | 2003: 08:11 16:45:32 |
| YCbCr positioning | centered |
| Compression | JPEG compression |
| X resolution | 72.00 |
| Y resolution | 72.00 |
| Resolution unit | Inch |
| Exposure time | 1/659 S |
| F-number | f/4.0 |
| Exposure program | Normal program |
| Exit version | Exif version 2.1 |
| Date and time (original) | 2003: 08211 16245232 |
| Date and time (digitized) | 2003: 08211 16245232 |
| Components configuration | Y Cb Cr - |
| Compressed nits per pi xel | 4.01 |
| Exposure bias | 0.0 |
| Max. aperture value | 2.00 |
| Metering mode | Pattern |
| Flash | Flash did not tire |

In various embodiments, the electronic device 600 may analyze an image and may generate a notification message using the analyzed result. For example, the electronic device 600 may include an image analysis module (e.g., the image analysis module 515 in FIG. 4). The image analysis module may analyze information such as person information, building information, and the atmosphere of the image included in the image from the image file. The electronic device 600 may generate a notification message, using the analyzed result.

In various embodiments, the electronic device 600 may generate a notification message, using information stored in a cloud server. For example, the electronic device 600 may receive a content file stored in a cloud server together with a message. In this case, the electronic device 600 may generate a notification message, using the storage location information of the content file. For example, when a photo file stored in a Hawaii folder is transmitted, a notification message such as "an image stored in the Hawaii folder of a cloud service has been received." may be generated.

Referring to screen 1110, the electronic device 600 according to various embodiments may receive a message to which a video file is attached, and may generate a notification message 1115 related to the message. In various embodiments, the electronic device 600 may generate a notification message, using at least one of the name of the received video file or meta data included in the video file.

In various embodiments, the electronic device 600 may receive a message to which an audio file is attached. The electronic device 600 may provide a notification message by playing at least part of the received audio file. For example, when an audio file with the length of 1 minute is received, the electronic device 600 may allow a user to know which audio file has been received, by playing the audio file for about 5 to 10 seconds.

In various embodiments, the electronic device 600 may receive a message including a content file and text. The electronic device 600 may generate a notification message, using context information about the content file and the text. For example, when the text of 'what about here' and a message to which the photo of café is attached are received from user A, the electronic device 600 may generate a notification message such as 'a message of 'what about here' has been reached together with the photo of café from A'.

Figure 13:
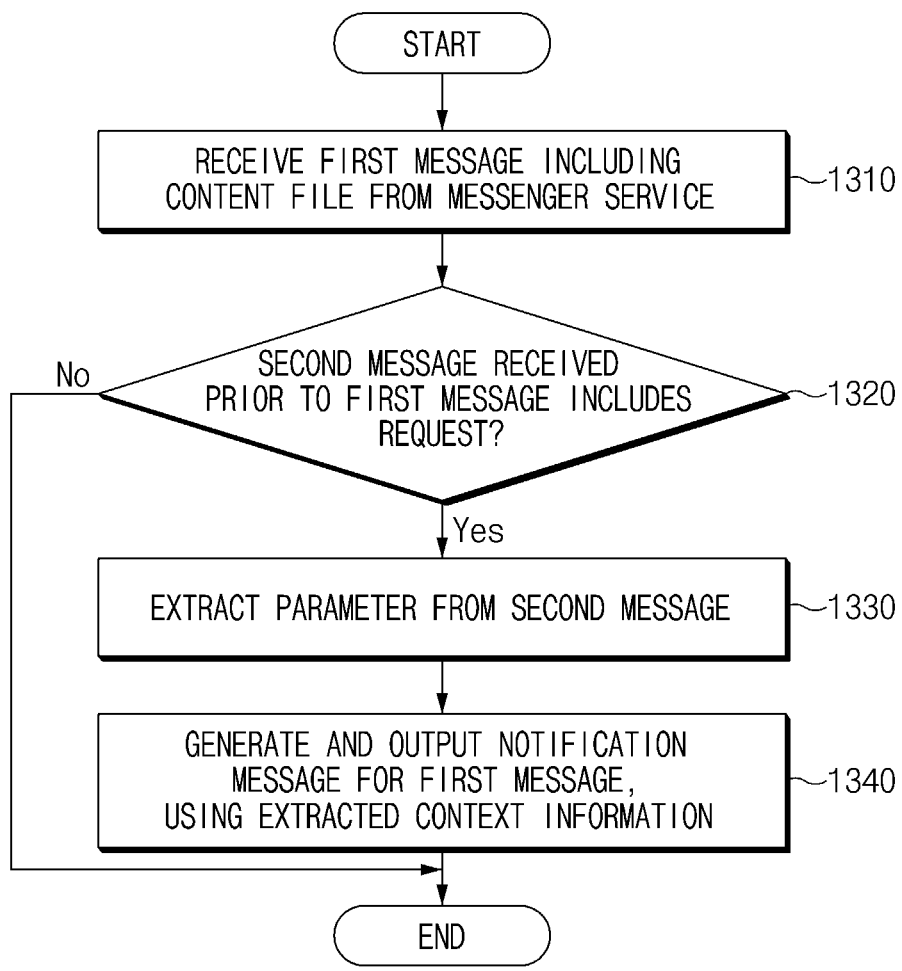
FIG. 13 illustrates a method of generating a notification message using context information on a message service according to various embodiments.
Figure 14:
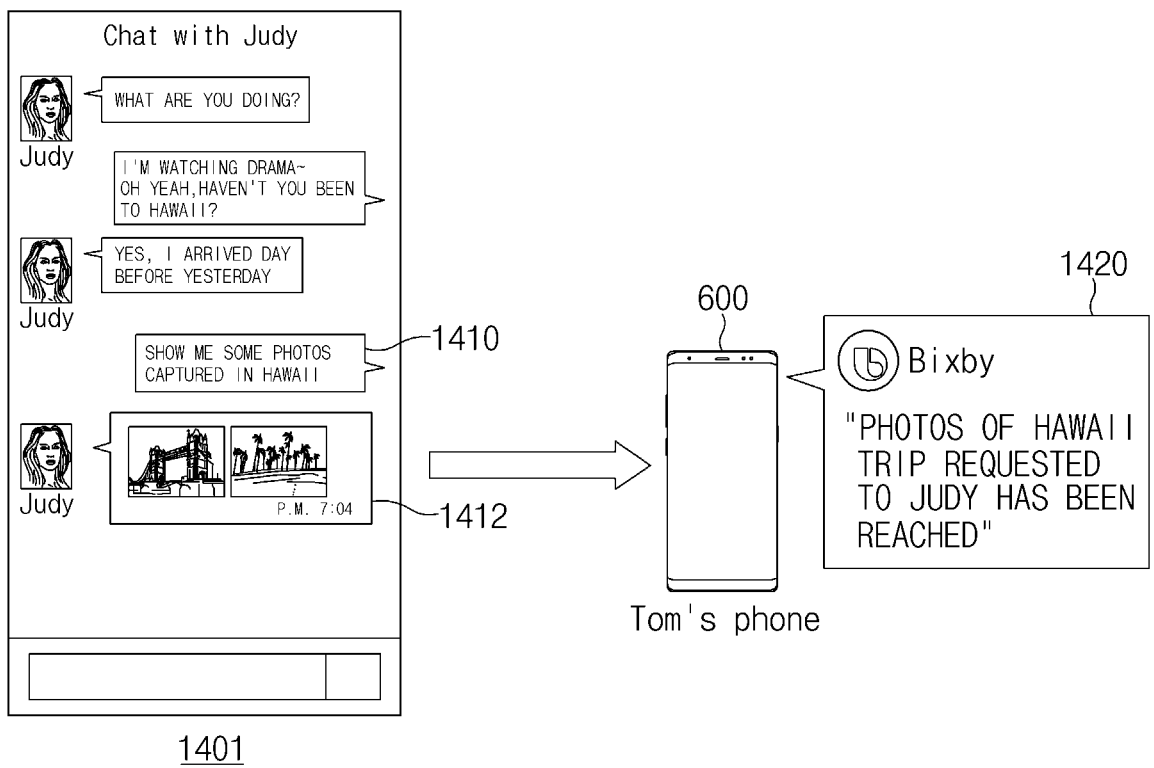
FIG. 14 illustrates an embodiment of generating a notification message on a message service according to various embodiments.

FIG. 13 illustrates a method of generating a notification message using context information on a message service according to various embodiments. FIG. 14 illustrates an embodiment of generating a notification message on a message service according to various embodiments.

In various embodiments, the intelligence system 500 may provide a chat service. The intelligence system 500 may generate a notification for a message received through a chat service, using context information extracted from the chat service.

In operation 1310, the intelligence system 500 may receive a first message including a content file through the chat service.

Referring to FIG. 14, a message 1412 to which an image file is attached may be received through a chat interface 1401.

In operation 1330, the intelligence system 500 may determine whether the second message received in advance prior to the first message includes a request. For example, the intelligence system 500 may determine whether the second message includes a specified verb for requesting an action, such as 'please do it' or 'please'.

For example, when the second message includes the request, in operation 1340, the intelligence system 500 may extract context information from a second message. In an embodiment, the first message may be a message received within a predetermined time after the second message is received. For example, a message 1410 ('show me some photos captured in Hawaii') (e.g., the second message) of the chat interface 1401 may include a request to send a photo. The intelligence system 500 may extract context information from the message 1410 previously received prior to a message 1412 (e.g., a first message) to which an image file is attached. For example, the context information of a 'Hawaii trip' and 'photos requested to Judy' may be extracted.

In operation 1350, the intelligence system 500 may generate and output a notification message for the first message, using the extracted context information. In FIG. 14, the electronic device 600 may generate a notification message for the message 1412, using the context information such as 'Hawaii trip' and 'photos requested to Judy'. For example, the intelligence system 500 may generate and output a notification message 1420 of 'Hawaii trip photos requested to Judy has been reached', further using information about the sender of photos and the type of the received content file.

Figure 15:
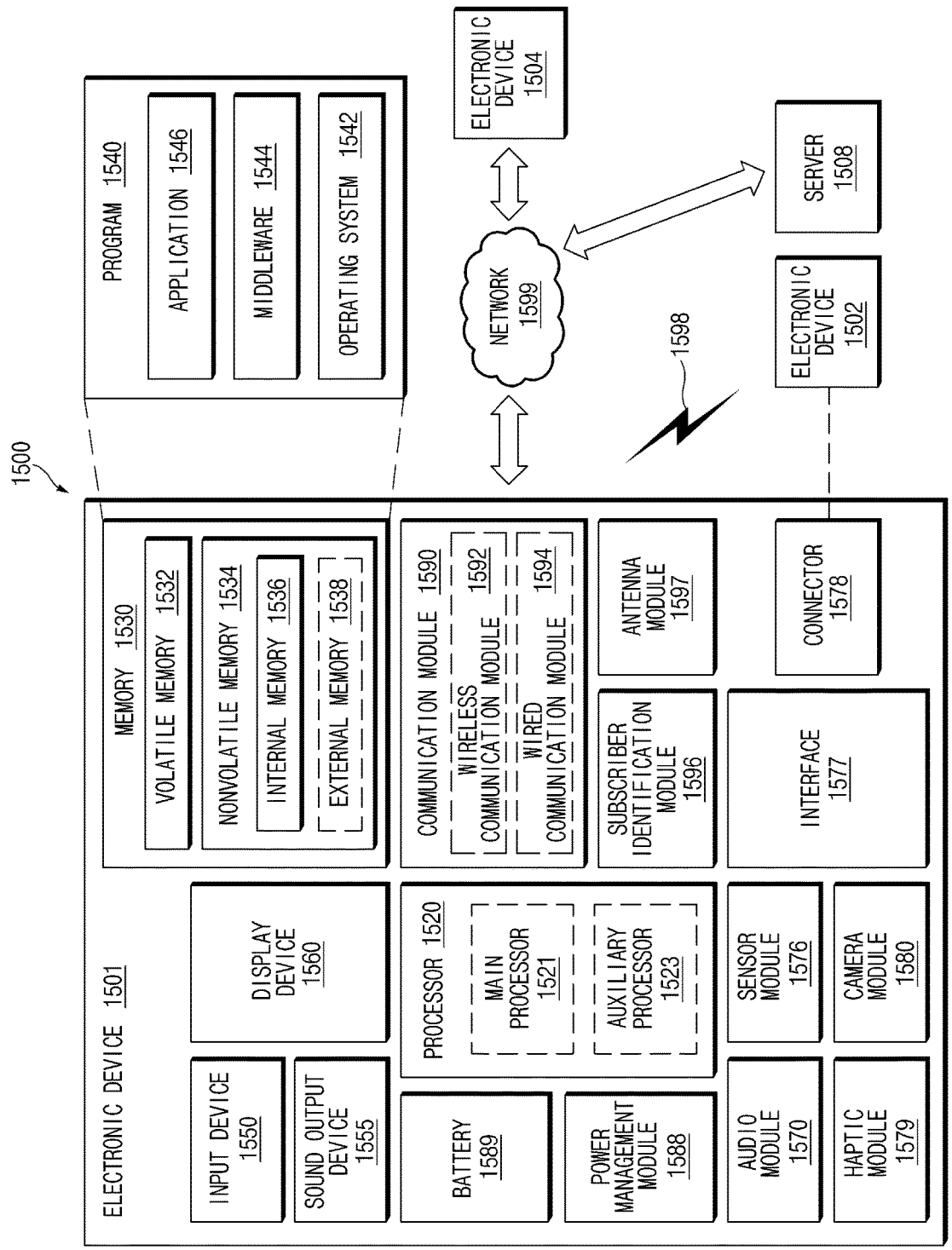
FIG. 15 illustrates an electronic device in a network environment, according to various embodiments.

FIG. 15 illustrates an electronic device 1501 in a network environment 1500, according to various embodiments. An electronic device according to various embodiments of the disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automated teller machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of the disclosure may not be limited to the above-described devices, and may provide functions of a plurality of devices like smartphones which have measurement function of personal biometric information (e.g., heart rate or blood glucose). In the disclosure, the term "user" may refer to a person who uses an electronic device or may refer to a device (e.g., an artificial intelligence electronic device) that uses the electronic device.

Referring to FIG. 15, under the network environment 1500, the electronic device 1501 (e.g., the user terminal 510 of FIG. 4) may communicate with an electronic device 1502 through short-range wireless communication 1598 or may communication with an electronic device 1504 or a server 1508 through a network 1599. According to an embodiment, the electronic device 1501 may communicate with the electronic device 1504 through the server 1508.

According to an embodiment, the electronic device 1501 may include a bus 1510, a processor 1520 (e.g., the processor 512 of FIG. 4), a memory 1530, an input device 1550 (e.g., a microphone or a mouse), a display device 1560, an audio module 1570, a sensor module 1576, an interface 1577, a haptic module 1579, a camera module 1580, a power management module 1588, a battery 1589, a communication module 1590, and a subscriber identification module 1596. According to an embodiment, the electronic device 1501 may not include at least one (e.g., the display device 1560 or the camera module 1580) of the above-described components or may further include other component(s).

The bus 1510 may interconnect the above-described components 1520 to 1590 and may include a circuit for conveying signals (e.g., a control message or data) between the above-described components.

The processor 1520 may include one or more of a central processing unit (CPU), an application processor (AP), a graphic processing unit (GPU), an image signal processor (ISP) of a camera or a communication processor (CP). According to an embodiment, the processor 1520 may be implemented with a system on chip (SoC) or a system in package (SiP). For example, the processor 1520 may drive an operating system (OS) or an application program to control at least one of another component (e.g., hardware or software component) of the electronic device 1501 connected to the processor 1520 and may process and compute various data. The processor 1520 may load a command or data, which is received from at least one of other components (e.g., the communication module 1590), into a volatile memory 1532 to process the command or data and may store the result data into a nonvolatile memory 1534.

The memory 1530 may include, for example, the volatile memory 1532 or the nonvolatile memory 1534. The volatile memory 1532 may include, for example, a random access memory (RAM) (e.g., a dynamic RAM (DRAM), a static RAM (SRAM), or a synchronous DRAM (SDRAM)). The nonvolatile memory 1534 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 1534 may be configured in the form of an internal memory 1536 or the form of an external memory 1538 which is available through connection only if necessary, according to the connection with the electronic device 1501. The external memory 1538 may further include a flash drive such as compact flash (CF), secure digital (SD), micro secure digital (Micro-SD), mini secure digital (Mini-SD), extreme digital (xD), a multimedia card (MMC), or a memory stick. The external memory 1538 may be operatively or physically connected with the electronic device 1501 in a wired manner (e.g., a cable or a universal serial bus (USB)) or a wireless (e.g., Bluetooth) manner.

For example, the memory 1530 may store, for example, at least one different software component, such as a command or data associated with the program 1540, of the electronic device 1501. The program 1540 may include, for example, a kernel 1541, a library 1543, an application framework 1545 or an application program (interchangeably, "application") 1547.

The input device 1550 may include a microphone, a mouse, or a keyboard. According to an embodiment, the keyboard may include a keyboard physically connected or a virtual keyboard displayed through the display device 1560.

The display device 1560 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1501.

The audio module 1570 may convert, for example, from a sound into an electrical signal or from an electrical signal into the sound. According to an embodiment, the audio module 1570 may acquire sound through the input device 1550 (e.g., a microphone) or may output sound through an output device (not illustrated) (e.g., a speaker or a receiver) included in the electronic device 1501, an external electronic device (e.g., the electronic device 1502 (e.g., a wireless speaker or a wireless headphone)) or an electronic device 1506 (e.g., a wired speaker or a wired headphone) connected with the electronic device 1501

The sensor module 1576 may measure or detect, for example, an internal operating state (e.g., power or temperature) of the electronic device 1501 or an external environment state (e.g., an altitude, a humidity, or brightness) to generate an electrical signal or a data value corresponding to the information of the measured state or the detected state. The sensor module 1576 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 1576 may further include a control circuit for controlling at least one or more sensors included therein. According to an embodiment, the electronic device 1501 may control the sensor module 1576 by using the processor 1520 or a processor (e.g., a sensor hub) separate from the processor 1520. In the case that the separate processor (e.g., a sensor hub) is used, while the processor 1520 is in a sleep state, the separate processor may operate without awakening the processor 1520 to control at least a portion of the operation or the state of the sensor module 1576.

According to an embodiment, the interface 1577 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 1578 may physically connect the electronic device 1501 and the electronic device 1506. According to an embodiment, the connector 1578 may include, for example, an USB connector, an SD card/MMC connector, or an audio connector (e.g., a headphone connector).

The haptic module 1579 may convert an electrical signal into mechanical stimulation (e.g., vibration or motion) or into electrical stimulation. For example, the haptic module 1579 may apply tactile or kinesthetic stimulation to a user. The haptic module 1579 may include, for example, a motor, a piezoelectric element, or an electric stimulator.

The camera module 1580 may capture, for example, a still image and a moving picture. According to an embodiment, the camera module 1580 may include at least one lens (e.g., a wide-angle lens and a telephoto lens, or a front lens and a rear lens), an image sensor, an image signal processor, or a flash (e.g., a light emitting diode or a xenon lamp).

The power management module 1588, which is to manage the power of the electronic device 1501, may constitute at least a portion of a power management integrated circuit (PMIC).

The battery 1589 may include a primary cell, a secondary cell, or a fuel cell and may be recharged by an external power source to supply power at least one component of the electronic device 1501.

The communication module 1590 may establish a communication channel between the electronic device 1501 and an external device (e.g., the first external electronic device 1502, the second external electronic device 1504, or the server 1508). The communication module 1590 may support wired communication or wireless communication through the established communication channel. According to an embodiment, the communication module 1590 may include a wireless communication module 1592 or a wired communication module 1594. The communication module 1590 may communicate with the external device through a first network 1598 (e.g. a short range communication network such as Bluetooth or infrared data association (IrDA)) or a second network 1599 (e.g., a wireless wide area network such as a cellular network) through a relevant module among the wireless communication module 1592 or the wired communication module 1594.

The wireless communication module 1592 may support, for example, cellular communication, short-range wireless communication, global navigation satellite system (GNSS) communication. The cellular communication may include, for example, long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). The short-range wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a Global Positioning System (GPS), a Global Navigation Satellite System (Glonass), Beidou Navigation Satellite System (Beidou), the European global satellite-based navigation system (Galileo), or the like. In the disclosure, "GPS" and "GNSS" may be interchangeably used.

According to an embodiment, when the wireless communication module 1592 supports cellar communication, the wireless communication module 1592 may, for example, identify or authenticate the electronic device 1501 within a communication network using the subscriber identification module (e.g., a SIM card) 1596. According to an embodiment, the wireless communication module 1592 may include a communication processor (CP) separate from the processor 1520 (e.g., an application processor (AP)). In this case, the communication processor may perform at least a portion of functions associated with at least one of components 1510 to 1596 of the electronic device 1501 in substitute for the processor 1520 when the processor 1520 is in an inactive (sleep) state, and together with the processor 1520 when the processor 1520 is in an active state. According to an embodiment, the wireless communication module 1592 may include a plurality of communication modules, each supporting only a relevant communication scheme among cellular communication, short-range wireless communication, or a GNSS communication.

The wired communication module 1594 may include, for example, a local area network (LAN) service, a power line communication, or a plain old telephone service (POTS).

For example, the first network 1598 may employ, for example, Wi-Fi direct or Bluetooth for transmitting or receiving commands or data through wireless direct connection between the electronic device 1501 and the first external electronic device 1502. The second network 1599 may include a telecommunication network (e.g., a computer network such as a LAN or a WAN, the Internet or a telephone network) for transmitting or receiving commands or data between the electronic device 1501 and the second electronic device 1504.

According to various embodiments, the commands or the data may be transmitted or received between the electronic device 1501 and the second external electronic device 1504 through the server 1508 connected with the second network 1599. Each of the first and second external electronic devices 1502 and 1504 may be a device of which the type is different from or the same as that of the electronic device 1501. According to various embodiments, all or a part of operations that the electronic device 1501 will perform may be executed by another or a plurality of electronic devices (e.g., the electronic devices 1502 and 1504 or the server 1508). According to an embodiment, in the case that the electronic device 1501 executes any function or service automatically or in response to a request, the electronic device 1501 may not perform the function or the service internally, but may alternatively or additionally transmit requests for at least a part of a function associated with the electronic device 1501 to any other device (e.g., the electronic device 1502 or 1504 or the server 1508). The other electronic device (e.g., the electronic device 1502 or 1504 or the server 1508) may execute the requested function or additional function and may transmit the execution result to the electronic device 1501. The electronic device 1501 may provide the requested function or service using the received result or may additionally process the received result to provide the requested function or service. To this end, for example, cloud computing, distributed computing, or client-server computing may be used.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device (e.g., the memory 1030).

The term "module" used herein may include a unit, which is implemented with hardware, software, or firmware, and may be interchangeably used with the terms "logic", "logical block", "part", "circuit", or the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory 1530) in the form of a program module. The instruction, when executed by a processor (e.g., the processor 1520), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each component (e.g., a module or a program module) according to various embodiments may be composed of single entity or a plurality of entities, a part of the above-described sub-components may be omitted, or other sub-components may be further included. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

The invention claimed is:

1. A system comprising:
a first electronic device including a wireless communication circuit, a microphone, and a speaker;
at least one processor, which is a part of the first electronic device or which remotely communicates with the first electronic device; and
at least one memory that resides on the first electronic device or outside the first electronic device, while being operatively connected to the at least one processor, wherein the memory stores instructions that, when executed, cause the at least one processor to:
receive a voice input through the microphone, wherein the voice input includes a request to perform a task using the first electronic device, and the task is associated with transmitting a message or an email including a content file to a second external device;
extract at least one parameter from the voice input;
perform the task using the wireless communication circuit; and
transmit at least part of the at least one parameter to the second external device,
wherein the at least one parameter includes context information associated with the content file,
wherein the context information includes metadata of the content file, and
wherein the metadata of the content file is used to indicate which content file the message of the email contains in a notification message notifying a receipt of the message of the email.

2. The system of claim 1, wherein the first electronic device includes a first processor among the at least one processor, and
wherein the system further comprises:
a server including a second processor among the at least one processor.

3. The system of claim 2, wherein the instructions cause the first processor to:
transmit the at least part of the at least one parameter, using the wireless communication circuit.

4. The system of claim 3, wherein instructions cause the first processor to:
transmit the at least part of the at least one parameter as meta data of the message or the email.

5. The system of claim 3, wherein the instructions cause the first processor to:
transmit the at least part of the at least one parameter as a part of content of the message or the email.

6. The system of claim 3, wherein the instructions cause the first processor to:
determine whether to transmit the at least part of the at least one parameter as meta data of the message or the email, or whether to transmit the at least part of the at least one parameter as a part of content of the message or the email, based on a type of the second external device.

7. The system of claim 2, wherein the instructions cause the second processor to:
extract the at least one parameter from the voice input.

8. The system of claim 1, wherein the instructions cause the at least one processor to:
extract the at least one parameter from a first voice input entered prior to the voice input from the first electronic device; and
transmit at least part of the extracted at least one parameter to the second external device.

9. At least one server comprising:
at least one processor providing a message service;
a wireless communication circuit configured to communicate with a first electronic device registered in the message service and a second electronic device registered in the message service; and
at least one memory electrically connected to the at least one processor and configured to store instructions,
wherein the instructions, when executed, cause the at least one processor to:
receive a voice input from the first electronic device through the message service, wherein the voice input corresponds to a message sending request including a content file;
extract context information associated with the content file from the voice input; and
transmit the extracted context information and a message including the content file to the second electronic device through the message service,
wherein the context information includes metadata of the content file, and
wherein the metadata of the content file is used to indicate which content file the message contains in a notification message notifying a receipt of the message.

10. An electronic device comprising:
a display, a speaker, and a wireless communication circuit;
a memory configured to store instructions; and
at least one processor,
wherein the at least one processor is configured to execute the stored instructions to:
control the wireless communication circuit to receive a message including a content file and context information associated with the content file from an external electronic device, together;
as a specified condition is satisfied, generate a notification message for notifying a receipt of the message using the context information and output the generated notification message through the speaker as a voice; and
as the specified condition is not satisfied, set the message to be displayed on the display,
wherein the context information includes metadata of the content file, and
wherein the notification message includes at least one keyword which is included in the metadata content file and indicates which content file the message contains.

11. The electronic device of claim 10, wherein the at least one processor is configured to:
determine whether the specified condition is satisfied, by determining whether a user may not look at the display.

12. The electronic device of claim 11, further comprising:
at least one sensor,
wherein the at least one processor is configured to:
determine whether the specified condition is satisfied, by determining whether the user of the electronic device is close to the electronic device, using the at least one sensor.

13. The electronic device of claim 11, wherein the at least one processor is configured to:
while a specified application is executed, determine that the specified condition is satisfied.

14. The electronic device of claim 10, wherein the at least one processor is configured to:
control the wireless communication circuit to receive the content file and the context information through a message application; and
generate the notification message, using information extracted from at least one message received through the message application, and the context information.

15. The electronic device of claim 14, wherein the at least one processor is configured to:
generate the notification message, using information extracted from a first message received prior to the message through the message application.

* * * * *